United States Patent
Pham et al.

(10) Patent No.: US 11,436,837 B2
(45) Date of Patent: Sep. 6, 2022

(54) INTERSECTION REGION DETECTION AND CLASSIFICATION FOR AUTONOMOUS MACHINE APPLICATIONS

(71) Applicant: NVIDIA Corporation, Santa Clara, CA (US)

(72) Inventors: Trung Pham, Santa Clara, CA (US); Berta Rodriguez Hervas, San Francisco, CA (US); Minwoo Park, Saratoga, CA (US); David Nister, Bellevue, WA (US); Neda Cvijetic, East Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 178 days.

(21) Appl. No.: 16/911,007

(22) Filed: Jun. 24, 2020

(65) Prior Publication Data

US 2020/0410254 A1  Dec. 31, 2020

Related U.S. Application Data

(60) Provisional application No. 62/866,158, filed on Jun. 25, 2019.

(51) Int. Cl.
*G06V 20/56* (2022.01)
*G06N 3/04* (2006.01)
(Continued)

(52) U.S. Cl.
CPC ........ *G06V 20/56* (2022.01); *G05B 13/027* (2013.01); *G06K 9/6217* (2013.01);
(Continued)

(58) Field of Classification Search
CPC ........ G06V 20/56; G06V 30/274; G06T 7/11; G06T 3/4046; G06T 5/002; G06T 11/20;
(Continued)

(56) References Cited

U.S. PATENT DOCUMENTS 10,885,698 B2   1/2021  Muthler et al.
11,321,924 B2 *  5/2022  Molyneaux .......... G02B 27/017
(Continued)

OTHER PUBLICATIONS

Park, Jeong Joon, et al. "Deepsdf: Learning continuous signed distance functions for shape representation." Proceedings of the IEEE/CVF Conference on Computer Vision and Pattern Recognition. 2019. (Year: 2019).*
(Continued)

*Primary Examiner* — Utpal D Shah
(74) *Attorney, Agent, or Firm* — Taylor English Duma LLP

(57) ABSTRACT

In various examples, live perception from sensors of a vehicle may be leveraged to detect and classify intersection contention areas in an environment of a vehicle in real-time or near real-time. For example, a deep neural network (DNN) may be trained to compute outputs—such as signed distance functions—that may correspond to locations of boundaries delineating intersection contention areas. The signed distance functions may be decoded and/or post-processed to determine instance segmentation masks representing locations and classifications of intersection areas or regions. The locations of the intersections areas or regions may be generated in image-space and converted to world-space coordinates to aid an autonomous or semi-autonomous vehicle in navigating intersections according to rules of the road, traffic priority considerations, and/or the like.

20 Claims, 15 Drawing Sheets

(51) Int. Cl.
| | |
|---|---|
| *G06T 5/00* | (2006.01) |
| *G06N 3/08* | (2006.01) |
| *G05B 13/02* | (2006.01) |
| *G06T 3/40* | (2006.01) |
| *G06T 7/11* | (2017.01) |
| *G06T 11/20* | (2006.01) |
| *G06K 9/62* | (2022.01) |
| *G06V 30/262* | (2022.01) |

(52) U.S. Cl.
CPC ............ *G06K 9/6267* (2013.01); *G06N 3/04* (2013.01); *G06N 3/08* (2013.01); *G06T 3/4046* (2013.01); *G06T 5/002* (2013.01); *G06T 7/11* (2017.01); *G06T 11/20* (2013.01); *G06V 30/274* (2022.01); *G06T 2207/20081* (2013.01); *G06T 2207/20084* (2013.01); *G06T 2207/30252* (2013.01); *G06T 2210/12* (2013.01)

(58) Field of Classification Search
CPC .. G05B 13/027; G06K 9/6217; G06K 9/6267; G06N 3/04; G06N 3/08
See application file for complete search history.

(56) References Cited

U.S. PATENT DOCUMENTS

| | | | |
|---|---|---|---|
| 2012/0194516 A1* | 8/2012 | Newcombe | G06T 17/00 345/420 |
| 2016/0364907 A1* | 12/2016 | Schoenberg | G02B 27/017 |
| 2019/0061771 A1 | 2/2019 | Bier et al. | |
| 2019/0120640 A1 | 4/2019 | Ho et al. | |
| 2019/0146497 A1 | 5/2019 | Urtasun et al. | |
| 2019/0189001 A1* | 6/2019 | Smothers | G08G 1/0104 |
| 2019/0197774 A1* | 6/2019 | Molyneaux | G06T 15/08 |
| 2020/0117213 A1* | 4/2020 | Tian | B25J 19/023 |
| 2020/0117898 A1* | 4/2020 | Tian | G06F 3/04815 |
| 2021/0150722 A1* | 5/2021 | Homayounfar | G06T 7/11 |
| 2021/0300379 A1* | 9/2021 | Hackeloeer | B60W 30/18154 |
| 2022/0132145 A1* | 4/2022 | Choi | H04N 19/86 |

OTHER PUBLICATIONS

Chen, Jianyu, Changliu Liu, and Masayoshi Tomizuka. "Foad: Fast optimization-based autonomous driving motion planner." 2018 Annual American Control Conference (ACC). IEEE, 2018. (Year: 2018).*

International Preliminary Report on Patentability received for PCT Application No. PCT/US2020/039430, dated Jan. 6, 2022, 12 pages.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

International Search Report and Written Opinion received for PCT Patent Application No. PCT/US2020/039430, dated Oct. 9, 2020, 13 pages.

* cited by examiner

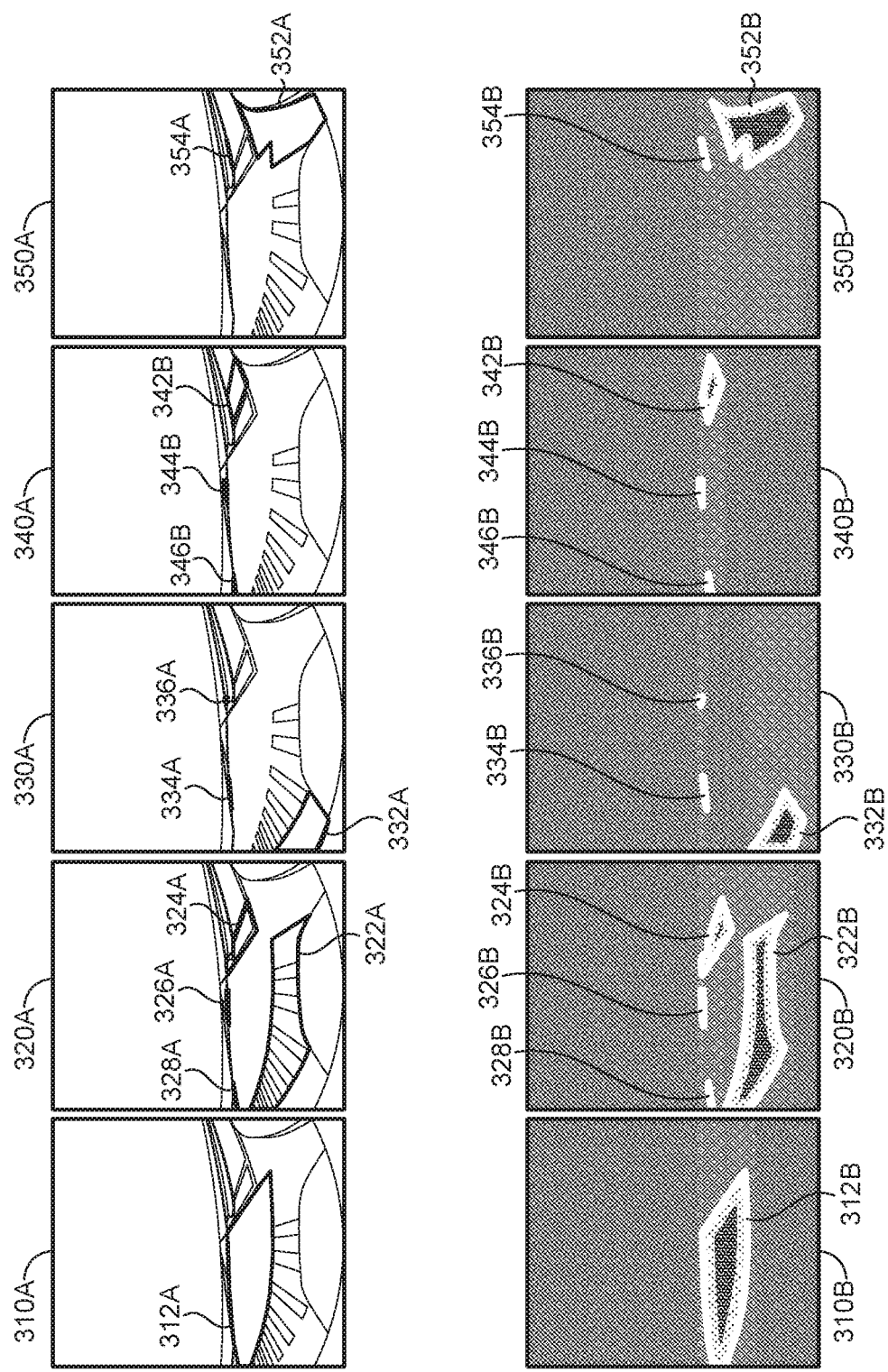

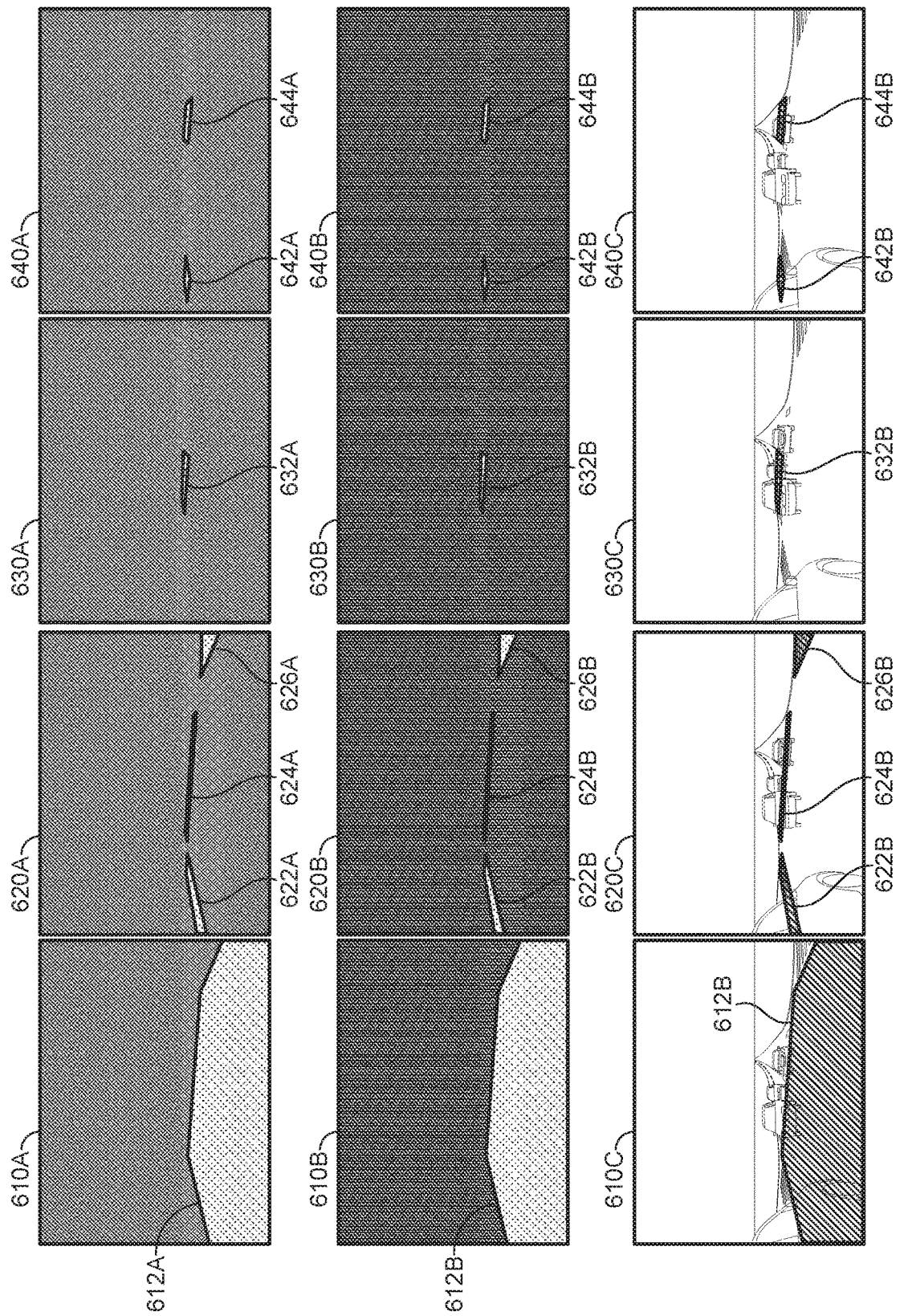

INTERSECTION REGION DETECTION AND CLASSIFICATION FOR AUTONOMOUS MACHINE APPLICATIONS

CROSS-REFERENCE TO RELATED APPLICATIONS

This application claims the benefit of U.S. Provisional Application No. 62/866,158, filed on Jun. 25, 2019, which is hereby incorporated by reference in its entirety.

BACKGROUND

Autonomous driving systems and advanced driver assistance systems (ADAS) may use various sensors, such as cameras, LIDAR sensors, RADAR sensors, etc., to perform various tasks—such as lane keeping, lane changing, lane assignment, camera calibration, turning, path planning, and localization. For example, for autonomous and ADAS systems to operate independently and efficiently, an understanding of the surrounding environment of the vehicle in real-time or near real-time may be generated. This understanding may include information as to locations and types of objects, obstacles, lanes and/or intersections in the environment with respect to various demarcations, such as lanes, road boundaries, intersections, and/or the like. The information of the surrounding environment may be used by a vehicle when making decisions, such as which path or trajectory to follow, how to apply rules of the road, and when, where, and/or how long to stop.

As an example, information regarding locations, attributes, and layouts of intersections—such as where other vehicles or pedestrians may be located, whether other vehicles have priority to traverse an intersection, and/or the like—in an environment of an autonomous or semi-autonomous vehicle may prove valuable when making path planning, obstacle avoidance, and/or control decisions. This is particularly important when the vehicle is operating in urban and/or semi-urban driving environments, where intersection understanding and path planning becomes crucial due to the increased number of variables relative to a highway driving environment. For example, where a vehicle has to slow down to a full stop and wait for other vehicles with priority to traverse an intersection in a bi-directional, multi-lane driving environment, determining locations and classes of intersection areas (e.g., pedestrian crossing, vehicle entering, vehicle exiting, no lane, etc.) becomes critical to safe and effective autonomous and/or semi-autonomous driving.

In conventional systems, intersections may be interpreted by individually detecting and combining several features of an intersection and the surrounding environment. For example, to detect an intersection, intersection areas, multiple objects (e.g., traffic light, stop sign), vehicle positions, vehicle orientation, lanes, free-space boundaries, etc., may be separately detected—e.g., using a plurality of separate deep neural networks (DNNs)—and pieced together to generate a combined understanding of a single intersection. However, such solutions require accurate and detailed networks to recognize relevant features for intersection detection and combine a variety of features for each intersection to safely traverse the intersection while following different traffic priority rules. As a result, the more complex the intersections are, the more detailed the annotations are required to be to train the DNNs—thereby increasing the complexity of accurately detecting and classifying intersection areas while decreasing the scalability of intersection detection. Specifically, these conventional systems may not provide a clear and complete understanding of vehicles and/or pedestrians traversing the intersection that may be contenders with priority for traversing the intersection. In addition, many conventional systems also fail to robustly detect the intersection areas where occlusions are encountered in sensor data—e.g., due to buildings, or other vehicles or objects blocking portions of sensory fields of sensors of the vehicle.

Other conventional systems may analyze intersections by comparing the individually detected features to features in pre-stored high-definition (HD), three-dimensional (3D) maps of a driving surface of the vehicle. However, such map-based solutions are highly reliant on accuracy and availability of the maps. As such, these conventional systems fail when a map is outdated or unavailable for a certain area. For example, the process can be logistically more complex when manual labelling larger geographic regions (e.g., cities, states, countries) is required in order for the vehicle to independently and effectively navigate in locations with varying intersection types. These conventional systems also fail when a transient intersection condition (e.g., police directing traffic or a stopped school bus) exists that may not be reflected in the maps.

SUMMARY

Embodiments of the present disclosure relate to intersection contention area detection for autonomous machine applications. Systems and methods are disclosed that use a deep neural network(s) (DNN) to process sensor data from one or more sensors of a vehicle in order to detect regions of intersections—and classifications corresponding thereto—to holistically generate an understanding of the intersection in real-time or near real-time.

In contrast to conventional systems, such as those described above, the current system may use live perception of the vehicle to detect and classify intersection contention areas in a vehicle's environment. For example, a machine learning model(s)—such as a DNN—may be trained to compute outputs corresponding to an intersection—such as signed distance functions corresponding to intersection regions or areas and classes thereof—and a post-processor may use this information to effectively and accurately determine intersection region locations and classifications. The outputs may be post processed using various techniques—such as smoothing, clustering, thresholding, upsampling, etc.—to determine 3D world-space locations of the detected intersection areas. These world-space locations and/or classifications of the intersection areas may be used by the vehicle to safely and accurately navigate the intersection. For example, the outputs of the DNN may be used directly or indirectly (e.g., via decoding) to determine locations of each intersection areas and classifications corresponding thereto.

As a result of using a holistic approach in real-time or near real-time to generate an understanding of each intersection region of an intersection, the process of detecting and classifying intersection contention areas may be comparatively less time-consuming, less computationally intense, and more scalable as the system may learn to diagnose each intersection without requiring prior experience or knowledge of the intersection, and without requiring separately detecting and then combining several features of the intersection. As a result, the vehicle may be capable of autonomously traveling more freely through cities, urban environments, and/or other locations without relying on HD maps—or in addition to relying HD maps.

BRIEF DESCRIPTION OF THE DRAWINGS

The present systems and methods for intersection contention area detection for autonomous machine applications are described in detail below with reference to the attached drawing figures, wherein:

FIG. 3 is an illustration of example ground truth signed distance functions for encoding intersection areas from annotations, in accordance with some embodiments of the present disclosure;

FIG. 6 is a visualization of example signed distance functions converted into corresponding instance segmentation masks using a post-processor, in accordance with some embodiments of the present disclosure;

DETAILED DESCRIPTION

Figure 1:
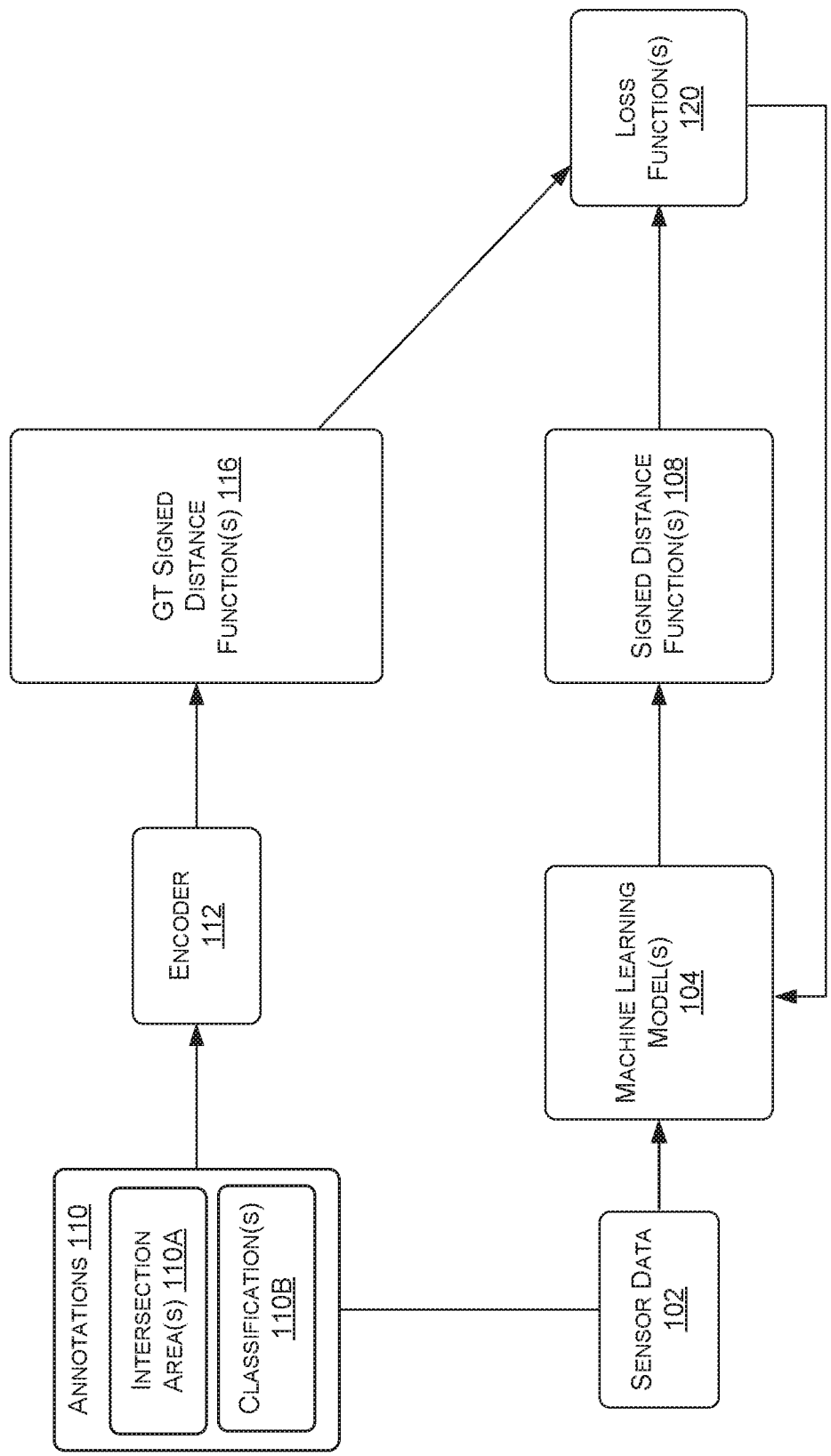
FIG. 1 is an example data flow diagram illustrating an example process for training a neural network to detect intersection areas for navigating intersections using outputs from sensors of a vehicle, in accordance with some embodiments of the present disclosure.

Systems and methods are disclosed related to intersection contention area detection for autonomous machine applications. Although the present disclosure may be described with respect to an example autonomous vehicle 900 (alternatively referred to herein as "vehicle 900" or "ego-vehicle 900," an example of which is described with respect to FIGS. 9A-9D), this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with intersection structure for vehicle applications, this is not intended to be limiting, and the systems and methods described herein may be used in augmented reality, virtual reality, robotics, security and surveillance, autonomous or semi-autonomous machine applications, and/or any other technology spaces where detection of intersection or other environment structures and/or poses may be used.

As described herein, in contrast to conventional approaches of intersection contention area detection using high-definition (HD) maps, the current systems and methods provide techniques to detect and classify intersection areas using outputs from sensors (e.g., cameras, RADAR sensors, LIDAR sensors, etc.) of a vehicle in real-time or near real-time. As such, for each intersection, live perception of the vehicle may be used to detect locations and/or attributes or classifications of the intersection areas corresponding to the intersection. Computer vision and/or machine learning model(s) (e.g., deep neural networks (DNNs), such as convolutional neural networks (CNNs)) may be trained to compute outputs that—after decoding, in embodiments—result in detected intersection areas, and/or classifications or attributes thereof, and the outputs may be used by the vehicle in conjunction with object and/or lane detections to effectively and accurately navigate the intersection(s) while conforming to associated traffic priority rules. An output of the computer vision and/or machine learning model(s) may include, in some embodiments, signed distance functions that represent pixel-based locations of the specific regions in the image where the various classified intersection areas are detected. In addition, in some embodiments, post-processing may be performed on the signed distance functions to generate instance segmentation masks corresponding to each detected intersection area and/or type.

As such, by using live perception to generate an understanding of intersection areas, the process of detecting and classifying intersection areas may be comparatively less time-consuming, less computationally intense, and more scalable as the system may learn to diagnose each intersection area in real-time or near real-time. In addition, and in further contrast to conventional systems, prior knowledge or experience of an intersection is not required—e.g., the system may execute accurately without the requirement for an available and up-to-date HD map.

In deployment, sensor data (e.g., images, videos, point clouds, depth maps, other sensor data representations, etc.) may be received and/or generated using sensors (e.g., cameras, RADAR sensors, LIDAR sensors, etc.) located or otherwise disposed on an autonomous or semi-autonomous vehicle. The sensor data may be applied to a DNN(s) that is trained to identify areas of interest pertaining to intersections (e.g., intersection interior, intersection entry, intersection exit, no lane, pedestrian crossing, unclear area, etc.) represented by the sensor data, as well as semantic information pertaining thereto. More specifically, the DNN(s) may be trained to compute signed distance functions corresponding to each intersection area instance detected. The signed distance functions may correspond to, for each pixel or point in the sensor data, a (pixel) distance to the nearest boundary corresponding to the intersection area, a location relative to an intersection area (e.g., negative for pixels outside the intersection area, positive for pixels inside the intersection area, or vice versa), semantic information corresponding to the intersection area (e.g., pedestrian crossing, intersection entry, intersection exit, unclear area, no lane, intersection interior, partially visible, fully visible, etc., or a combination thereof), and/or other information. In some examples, the computed intersection areas in the signed distance functions may be denoted by pixels or points represented by the sensor data where pixels on the boundary of an intersection area are represented by a value of zero, the pixels inside the boundaries are denoted by a positive distance value corresponding to a distance to the closest boundary of a region, and the pixels outside the boundaries are denoted by a negative value corresponding to a distance to the closest boundary of a region. One or more instances of each class of intersection area may be represented in a separate signed distance function (e.g., one signed distance function for each class, a separate signed distance function for each instance of each class, etc.). As such, the location and the class of the intersection areas may be determined—e.g., using a post-processor—based on the signed distance functions and the related information. As non-limiting examples, the intersection area classes may include pedestrian crossing, intersection entry, intersection exit, unclear area, no lane, intersection interior, partially visible, fully visible, and/or other information corresponding to the intersection.

The DNN(s) may be trained to predict various types of information—e.g., via any number of channels—that correspond to the intersection area classifications. For example, one or more of the channels may represent signed distance functions for a class of intersection area, and/or for each instance thereof. During training, the DNN(s) may be trained with images or other sensor data representations labeled or annotated with polygons representing pedestrian crossing areas, intersection entry areas, intersection exit areas, unclear areas, no lane areas, intersection interior areas, partially visible areas, fully visible areas, etc. In addition to the boundary label or annotation, the ground truth annotations may include semantic information—e.g., classifications—corresponding to each of the boundaries. The labeled polygons and semantic information may be used by a ground truth encoder to generate signed distance functions, each corresponding to an intersection area type corresponding to a region of the intersection as determined from the annotations. In some examples, each pixel in a signed distance function may be encoded with a distance value corresponding to a distance of the pixel to a closest boundary (e.g., along an annotated bounding shape of the training data) of an intersection area. In such examples, the pixels inside the intersection area may also be encoded with positive distance values, and the pixels outside the intersection area may be encoded with negative distance values, or vice versa. The pixels forming the boundaries of the intersection area may be encoded with a zero value for generating ground truth data.

In some examples, in addition to or alternatively from using signed distance functions, the labeled polygons and semantic information may be used by the ground truth encoder to generate one-hot encoding maps for each intersection area type, where the pixels inside an intersection area boundary are encoded with a value of 1, and the pixels outside the intersection area boundary are encoded with a value of 0. However, when using one-hot encoding, adjacent regions of the same type (e.g. having shared boundaries) may not be separately identifiable and, as a result, may reduce the accuracy as compared to embodiments using signed distance functions. Ultimately, the intersection areas may be encoded using signed distance functions and/or one-hot encoding maps with limited labeling required, as the information may be determined using the polygon annotations and semantic information.

Once the DNN(s) is trained, the DNN(s) may regress on outputs in the form of signed distance functions, one-hot encoding maps, and/or other outputs corresponding to the encoded ground truth channels the network is trained to predict, as described herein. Where the output corresponds to signed distance functions, the pixel distances corresponding to different classification types, and/or instances thereof, may be post-processed into two-dimensional (2D) coordinates that represent the 2D locations of the intersection areas (e.g., each pixel within the area, just boundary pixels or vertices thereof, etc.). In some embodiments, the signed distance functions may undergo Gaussian smoothing on a pixel-by-pixel basis to smooth out sharp peaks and fluctuations in the pixel values. The smoothed signed distance functions may then each be mapped to polygon areas representing the intersection areas based on the negative and positive pixel values associated with each pixel in corresponding signed distance functions. In some embodiments, a watershed clustering algorithm may be used to generate an instance segmentation map corresponding to each detected intersection area or region for each signed distance function. In such embodiments, for each intersection area, the pixels with distance values too high and too low may be filtered out using a predetermined threshold distance value—thereby reducing the compute resources required. The remaining pixels may be used to determine boundaries of the associated intersection areas, and/or to determine each pixel that is associated with a given region of the intersection having an associated classification type. Each pixel within boundaries of the polygon representing the intersection area may then be encoded with a pixel value depicting a segmentation for the corresponding intersection area. The output of the post-processing may be instance segmentation masks for each classification type—or instance thereof—corresponding to locations of different classification type regions of the intersection.

In some embodiments, the 2D image-space locations may be used to determine three-dimensional (3D) world-space coordinates for the intersection areas, to aid the vehicle in navigating through the world-space environment. For example, sensor intrinsic and/or extrinsic parameters may be used to map the 2D image-space location to known 3D world-space locations. In some embodiments, however, the DNN(s) may be trained on 3D data to predict locations in 3D world-space.

Now referring to FIG. 1, FIG. 1 is an example data flow diagram illustrating an example process 100 for training a neural network to detect intersection areas or regions to aid a vehicle in navigating intersections, in accordance with some embodiments of the present disclosure. It should be understood that this and other arrangements described herein are set forth only as examples. At a high level, the process 100 may include one or more machine learning model(s) 104 receiving one or more inputs, such as sensor data 102, and generating one or more outputs, such as one or more signed distance function(s) 108. In some examples, when used for training, the sensor data 102 may be referred to as training data. Although the sensor data 102 is primarily discussed with respect to image data representative of images, this is not intended to be limiting, and the sensor data 102 may include other types of sensor data used for intersection area detection, such as LIDAR data, SONAR data, RADAR data, and/or the like—e.g., as generated by one or more sensors of the vehicle 900 (FIGS. 9A-9D).

The process 100 may include generating and/or receiving sensor data 102 from one or more sensors. The sensor data 102 may be received, as a non-limiting example, from one or more sensors of a vehicle (e.g., vehicle 900 of FIGS. 9A-9C and described herein). The sensor data 102 may be used by the vehicle, and within the process 100, to detect intersection areas to navigate intersections in real-time or near real-time. The sensor data 102 may include, without limitation, sensor data 102 from any of the sensors of the vehicle including, for example and with reference to FIGS. 9A-9C, global navigation satellite systems (GNSS) sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 976, stereo camera(s) 968, wide-view camera(s) 970 (e.g., fisheye cameras), infrared camera(s) 972, surround camera(s) 974 (e.g., 360 degree cameras), long-range and/or mid-range camera(s) 978, speed sensor(s) 944 (e.g., for measuring the speed of the vehicle 900), and/or other sensor types. As another example, the sensor data 102 may include virtual (e.g., simulated or augmented) sensor data generated from any number of sensors of a virtual vehicle or other virtual object in a virtual (e.g., testing) environment. In such an example, the virtual sensors may correspond to a virtual vehicle or other virtual object in a simulated environment (e.g., used for testing, training, and/or validating neural network performance), and the virtual sensor data may represent sensor data captured by the virtual sensors within the simulated or virtual environment. As such, by using the virtual sensor data, the machine learning model(s) 104 described herein may be tested, trained, and/or validated using simulated or augmented data in a simulated environment, which may allow for testing more extreme scenarios outside of a real-world environment where such tests may be less safe.

In some embodiments, the sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

The sensor data 102 used for training may include original images (e.g., as captured by one or more image sensors), down-sampled images, up-sampled images, cropped or region of interest (ROI) images, otherwise augmented images, and/or a combination thereof. The machine learning model(s) 104 may be trained using the images (and/or other sensor data 102) as well as corresponding ground truth data. The ground truth data may include annotations, labels, masks, maps, and/or the like. For example, in some embodiments, the ground truth data may include ground truth (GT) signed distance function(s) 116. An encoder 112 may use the annotations 110 to encode the GT signed distance function(s) 116. In some embodiments, the annotations 110 may include intersection area(s) 110A and classification(s) 110B of the intersection area(s) 110A.

With reference to the annotations 110, the annotations 110 may be generated within a drawing program (e.g., an annotation program), a computer aided design (CAD) program, a labeling program, another type of program suitable for generating the annotations 110 and/or other of the GT signed distance function(s) 116, and/or may be hand drawn, in some examples. In any example, the annotations 110 and/or the GT signed distance function(s) 116 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies center or origin point and dimensions of areas, machine generates polygons and/or labels for intersection areas).

The intersection area(s) 110A may include annotations, or other label types, corresponding to bounding shapes—e.g., polygons—delineating areas of interest of intersections. In some examples, an intersection area may be delineated—e.g., within the sensor data representations of the sensor data 102—by one or more polygons corresponding to pedestrian crossing areas, intersection entry areas, intersection exit areas, unclear areas, no lane areas, intersection interior areas, partially visible areas, fully visible areas, etc., in the sensor data 102. The polygons may be generated as bounding boxes. The classification(s) 110B may be generated for each of the images (or other data representations) and/or for each one or more of the polygons in the images represented by the sensor data 102 used for training the machine learning model(s) 104. The number of classification(s) 110B may correspond to the number and/or types of features that the machine learning model(s) 104 is trained to predict, or to the number of intersection areas and/or types of features in the respective image.

Depending on the embodiment, the classification(s) 110B may correspond to classifications or tags corresponding to the feature type or intersection area class, such as but not limited to pedestrian crossing areas, intersection entry areas, intersection exit areas, unclear areas, no lane areas, intersection interior areas, partially visible areas, fully visible areas, and/or the like. In some examples, the classification(s) 110B may initially correspond to intersection interior areas and/or intersection exterior areas. An intersection interior area classification may refer to an intersection area(s) 110A that includes an area inside the intersection where paths of vehicles traversing the intersection in various directions may cross. An intersection exterior area classification may refer to an intersection area(s) 110A that includes areas outside of the intersection interior area.

The intersection area(s) 110A classified as intersection exterior areas may each further be labeled with classification(S) 110B corresponding to attributes corresponding to the feature type of intersection exit areas, including pedestrian crossing areas, intersection entry areas, intersection exit areas, unclear areas, no lane areas, and/or the like. Specifically, an intersection entry attribute may correspond to an intersection area(s) 110A where one or more vehicles are about to enter the corresponding intersection from various different directions. An intersection exit area may correspond to an intersection area(s) 110A where one or more vehicle(s) that recently exited the intersection in various directions may be located. It should be understood that information regarding intersection exit areas may be particularly important as the vehicle 900 must itself safely traverse the intersection exit area in order to safely traverse the intersection. Similarly, a pedestrian crossing area may refer to an intersection area(s) 110A that corresponds to pedestrian crossings located outside the intersection interior area(s). An area classified as a "No lane area" may correspond to an intersection area(s) 110A where vehicles are not allowed to traverse, for example, bike lanes, pedestrian walkways, and/or the like. An "Unclear area" attribute may correspond to an intersection area(s) where the travel direction for vehicles is unclear. In addition, the classification(s) 110A for the intersection interior area and intersection exterior area classes may also include one of fully visible area and/or partially visible area attribute. In examples, where the classification(s) 110B include fully visible area attribute or class label, the corresponding intersection area(s) 110A may include a fully visible surface, for example, without any obstructions. In contrast, where the classification(s) 110B include a partially visible area attribute or class label, the corresponding intersection area(s) 110A may include obstruction(s), such as occlusion(s) such that the driving surface in the area is only partially visible in the corresponding sensor data 102. The labeling ontologies described herein are for example purposes only, and additional and/or alternative class labels may be used without departing from the scope of the present disclosure.

Figure 2A:
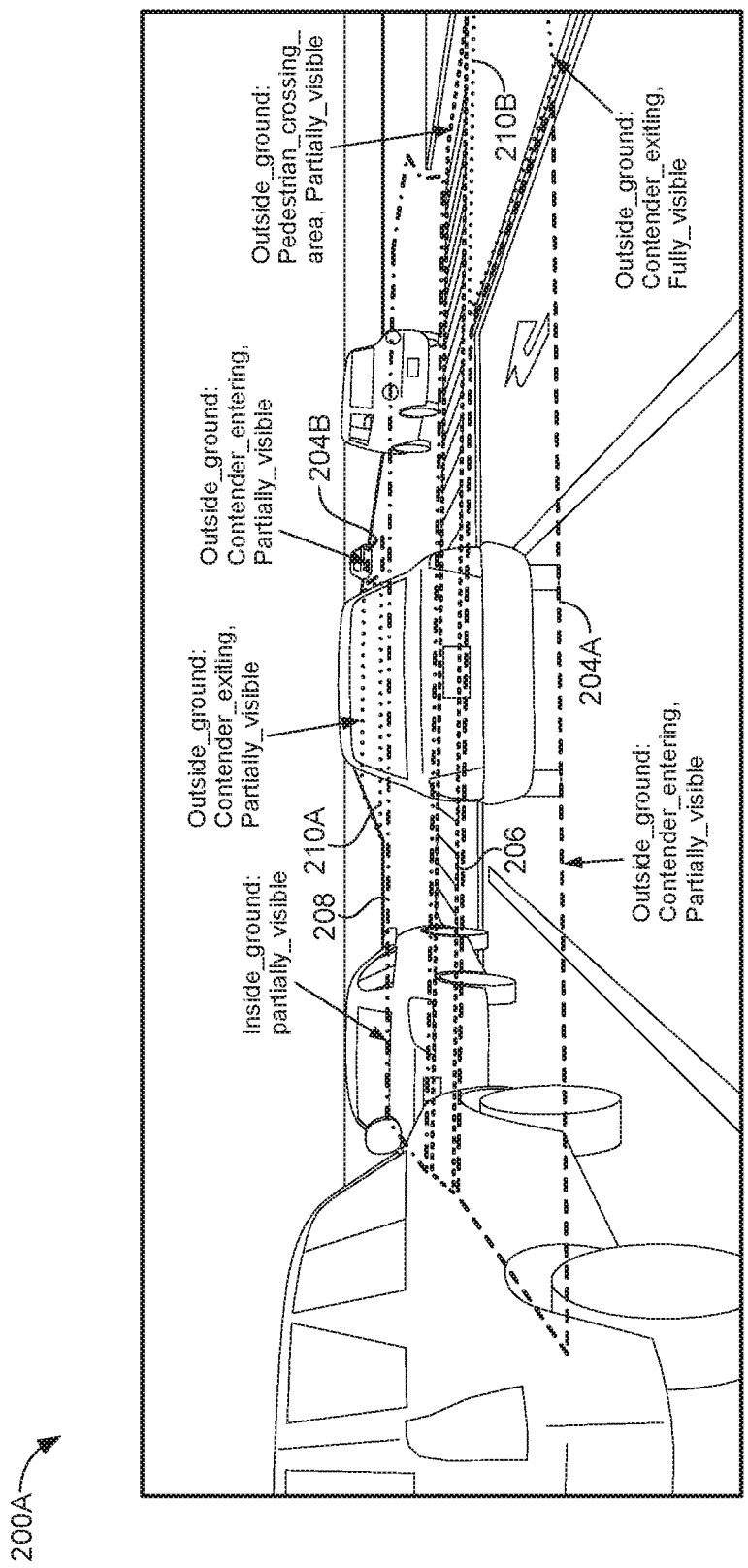
FIGS. 2A-2B are illustrations of example annotations for images for generating ground truth data for training a neural network to detect intersection areas, in accordance with some embodiments of the present disclosure.
Figure 2B:
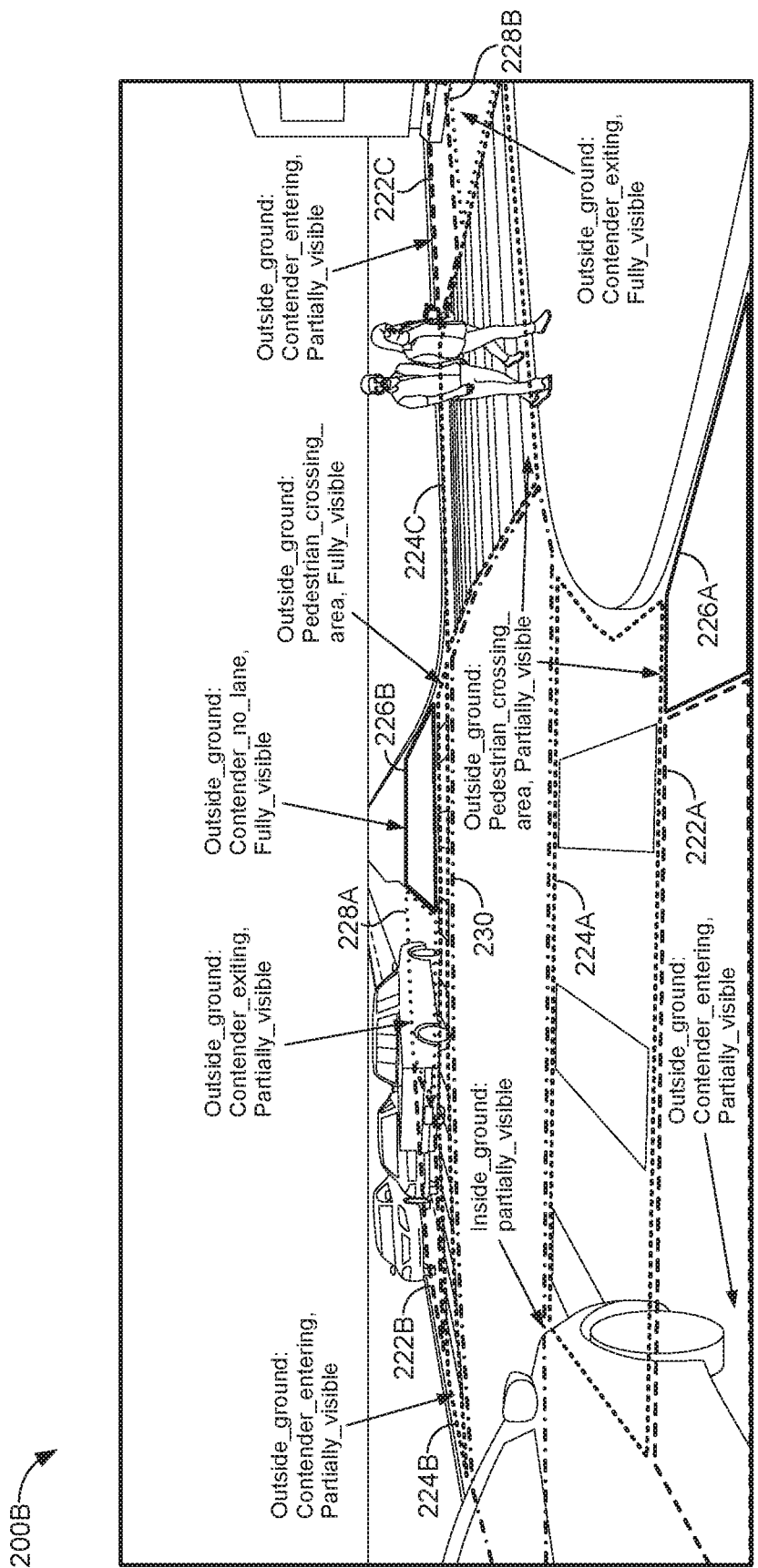

As non-limiting examples, and with respect to FIGS. 2A-2B, FIGS. 2A-2B illustrate example annotations applied to sensor data for use in ground truth generation for training a machine learning model to detect intersection areas, in accordance with some embodiments of the present disclosure. For example, FIG. 2A illustrates an example labeling (e.g., corresponding to the annotations 110) of an image 200A that may be used to generate ground truth data in accordance with the training process 100 of FIG. 1. Intersection areas or regions in an image may be annotated by intersection area(s) 110A (e.g., areas 204A, 204B, 206, 208, 210A, and 210B) and corresponding classifications (e.g., "intersection interior," "partially visible," "vehicle exit," "vehicle entry," "partially visible," "pedestrian crossing," etc.). For example, intersection area 204A may be labeled using a polygon and classified as having one or more attributes such as "intersection entry" and "partially visible." Similarly, intersection areas 204B, 206, 208, 210A, and 210B may be labeled using polygons, where intersection 204B may be classified as having one or more attributes such as "vehicle entry" and "partially visible," intersection area 206 may be classified as having one or more attributes such as "pedestrian crossing" and "partially visible," intersection area 208 may be classified as having one or more attributes such as "intersection interior" and "partially visible," intersection area 210A may be classified as having one or more attributes such as "vehicle exit" and "partially visible," and intersection area 210B may be classified as having one or more attributes such as "vehicle exit" and "fully visible." In some examples, each intersection area belonging to a common class or classification may also be annotated with a polygon of a matching color (or some other visual indication of semantic information). For example, the polygons for intersection areas 204A and 204B may be of the same color and/or style as they are both classified as vehicle entry classification. Similarly, the polygons for intersection areas 210A and 210B may be annotated using the same color and/or style as they are both classified as vehicle exit classification. These labeling or annotation styles may be known to the system 100 as corresponding to particular classes, and this information may be used to generate the encoded ground truth data for training the machine learning model(s) 104.

Referring now to FIG. 2B, FIG. 2B illustrates another example of annotations applied to sensor data to train a machine learning model to detect intersection areas, in accordance with some embodiments of the present invention. As depicted here, intersection areas 222A-222C, 224A-224C, 226A-226B, 228A-228B, and 230 may be annotated with polygons and corresponding classifications (e.g., "intersection interior," "partially visible," "vehicle exit," "vehicle entry," "partially visible," "pedestrian crossing," etc.). For example, intersection areas 222A, 222B, and 222C may be labeled using a similar color and/or style polygon and classified as one or more of "vehicle entry" and "partially visible." Similarly, intersection areas 224A, 224B, and 224C may be labeled using a similar color and/or style polygon and classified as one or more of "pedestrian crossing," "fully visible," and "partially visible." Intersection areas 226A, and 226B may be labeled using a similar color and/or style polygon and classified as one or more of "no lane," "fully visible," and partially visible. Intersection areas 228A and 228B may be labeled using a similar color and/or style polygon and classified as one or more of "vehicle exit," "fully visible," and "partially visible." Intersection area 230 may be labeled using a polygon and classified as one or more of "intersection interior" and "partially visible."

The annotations may be of similar visual representation for a same classification. As illustrated, intersection area 222A, 222B, and 222C may be classified as vehicle exit areas. In this way, similarly classified features of the image may be annotated in a similar manner. Further, it should be noted that classification(s) 110B may be compound nouns. The different classification labels may be represented in FIG. 2B by solid lines, dashed lines, etc., to represent different classifications. Further, the different classification labels may be nouns and/or compound nouns. This is not intended to be limiting, and any naming convention for classifications may be used to illustrate differences in classification labels for features (e.g., intersection areas) in the images.

Referring again to FIG. 1, the encoder 112 may be configured to encode the ground truth information corresponding to the intersection areas using the annotation(s) 110. The annotation(s) 110 may be encoded by the encoder 112 to generate the ground truth data, such as, the ground truth (GT) signed distance function(s) 116. In addition, because the spatial resolution of the sensor data 102 being applied to the machine learning model(s) 104 may be different—e.g., greater than, less than, etc.—the output spatial resolution corresponding to predictions of the machine learning model(s) 104, the ground truth information may be encoded into various formats.

For example, the annotation(s) 110 may be encoded in the form of GT signed distance function(s) 116—such that each intersection area class (e.g., intersection area type) is encoded in a separate GT signed distance function. The intersection area(s) 110A and the corresponding classification(s) 110B may be used by the encoder 112 to generate GT signed distance function(s) 116, each corresponding to an intersection area type corresponding to a region of the intersection as determined from the annotation(s) 110. In some examples, each pixel in a signed distance function(s) 116 may be encoded with a distance value corresponding to a distance of the pixel to a closest boundary (e.g., along an annotated bounding shape of the training data) of an intersection area(s) 110A of the corresponding intersection area type. In such examples, the pixels inside the intersection area(s) 110A (e.g., polygon) may also be encoded with positive distance values, and the pixels outside the intersection area(s) 110A may be encoded with negative distance values, or vice versa. The pixels forming the boundaries of the intersection area(s) 110A may be encoded with a zero value for generating the GT signed distance function(s) 116. The ground truth may thus provide a continuous valued representation of each pixel in the image, allowing upsampling of the resulting detections during deployment to be performed efficiently and accurately. Further, encoding each intersection area class into its own signed distance function may allow for recall and intensification of individual instances of intersection areas for each class with accuracy and precision.

In some examples, in addition to or alternatively from encoding GT signed distance function(s) 116, the labeled intersection area(s) 110A and corresponding classification(s) 110B may be used by the encoder 112 to generate one-hot encoding map(s) for each intersection area type. In such examples, the encoder 112 may use a binary representation to encode the intersection area(s) 110A, where the pixels inside an intersection area boundary (e.g., polygon boundary) may be encoded with a value of 1, and the pixels outside the intersection area boundary may be encoded with a value of 0. In some examples, the one-hot encoding map(s) may include multiple heat maps, with each heat map corresponding to different types of classification(s) 110B of intersection areas determined from the annotations 118. However, when using one-hot encoding map(s), adjacent regions of the same intersection area type (e.g., polygons having shared boundaries) may not be separately identifiable and, as a result, may reduce the accuracy as compared to embodiments using GT signed distance function(s) 116. In this way, the intersection area(s) 110A may be encoded using GT signed distance function(s) 116 and/or one-hot encoding map(s) with limited labeling required, as the information may be determined using the polygon annotations and semantic information.

As an example, with reference to FIG. 3, FIG. 3 illustrates ground truth signed distance functions 310B, 320B, 330B, 340B, 350B for encoding intersection areas from annotations 310A, 320A, 330A, 340A, and 350A, respectively. The annotated image 310A includes intersection area 312A. In some examples, intersection area 312A may include a polygon representing an intersection area and the corresponding signed distance function 310B may be used for encoding the intersection area 312A of a particular intersection area type. The intersection area 312A may be encoded in the signed distance function 310B such that the pixels inside the intersection area 312B are encoded with a positive distance value, the pixels outside the intersection area 312B are encoded with a negative distance value, and/or the pixels on the boundary of the intersection area 312B are encoded with a zero value. The distance value for a pixel may correspond to a distance of the respective pixel to a closest boundary of an intersection area or region (e.g., of the intersection classification type that the signed distance function corresponds to).

Similarly, the annotated image 320A includes intersection areas 322A, 324A, 326A, and 328A of another intersection area type as represented by annotation(s) 110. In some examples, intersection areas 322A, 324A, 326A, and 328A may include a corresponding polygon representing the respective intersection areas. The corresponding signed distance function 320B may be used for encoding the intersection areas 322A, 324A, 326A, and 328A of another intersection area type. The intersection areas 322A, 324A, 326A, and 328A may be encoded in the signed distance function 320B such that the pixels inside each of the intersection areas 322B, 324B, 326B, and 328B are encoded with a positive distance value, the pixels outside the intersection areas 322A, 324A, 326A, and 328A are encoded with a negative distance value, and the pixels on the boundary of each of the intersection areas 322A, 324A, 326A, and 328A are encoded with a zero value. Signed distance functions 330B, 340B, and 350B may similarly be generated to represent their corresponding intersection area types by encoding intersection areas in the annotations 330A, 340A, and 350A, respectively.

Once the GT signed distance function(s) 116 is generated for each instance of the sensor data 102 (e.g., for each image where the sensor data 102 includes image data), the machine learning model(s) 104 may be trained using the GT signed distance function(s) 116. For example, the machine learning model(s) 104 may generate signed distance function(s) 108, and the signed distance function(s) 108 may be compared—using the loss function(s) 120—to the GT signed distance function(s) 116 corresponding to the respective instance of the sensor data 102. As such, feedback from the loss function(s) 120 may be used to update parameters (e.g., weights and biases) of the machine learning model(s) 104 in view of the GT signed distance function(s) 116 until the machine learning model(s) 104 converges to an acceptable or desirable accuracy. Using the process 100, the machine learning model(s) 104 may be trained to accurately predict the signed distance function(s) 108 (and/or associated classifications) from the sensor data 102 using the loss function(s) 120 and the GT signed distance function(s) 116. In some examples, different loss functions 120 may be used to train the machine learning model(s) 104 to predict different signed distance function(s) 108 for each semantic class type (e.g., intersection area type). For example, a first loss function(s) 120 may be used for comparing the signed distance function(s) 108 and the GT signed distance function(s) 116 for a first semantic class type and a second loss function(s) 120 may be used for comparing the signed distance function(s) 108 and the GT signed distance function(s) 116 for a second semantic class type. As such, in non-limiting embodiments, one or more of the output channels can be trained using a different loss function(s) 120 than another of the output channels.

The machine learning model(s) 104 may use the sensor data 102 to compute the signed distance function(s) 108, which may ultimately be applied to a decoder or one or more other post-processing components (described in more detail herein at least with respect to FIG. 5) to generate signed distance functions, classifications, and/or other information. Although examples are described herein with respect to using deep neural networks (DNNs), and specifically convolutional neural networks (CNNs), as the machine learning model(s) 104 (e.g., with respect to FIGS. 1 and 5), this is not intended to be limiting. For example, and without limitation, the machine learning model(s) 104 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of machine learning models.

As an example, such as where the machine learning model(s) 104 include a CNN, the machine learning model(s) 104 may include any number of layers. One or more of the layers may include an input layer. The input layer may hold values associated with the sensor data 102 (e.g., before or after post-processing). For example, when the sensor data 102 is an image, the input layer may hold values representative of the raw pixel values of the image(s) as a volume (e.g., a width, a height, and color channels (e.g., RGB), such as 32×32×3).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers of the CNN may be provided as input to a fully connected layer(s) of the CNN. In some examples, one or more convolutional streams may be implemented by the machine learning model(s) 104, and some or all of the convolutional streams may include a respective fully connected layer(s).

In some non-limiting embodiments, the machine learning model(s) 104 may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the machine learning model(s) 104, this is not intended to be limiting. For example, additional or alternative layers may be used in the machine learning model(s) 104, such as normalization layers, SoftMax layers, and/or other layer types.

In embodiments where the machine learning model(s) 104 includes a CNN, different orders and/or numbers of the layers of the CNN may be used depending on the embodiment. In other words, the order and number of layers of the machine learning model(s) 104 is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the machine learning model(s) 104 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

Figure 4:
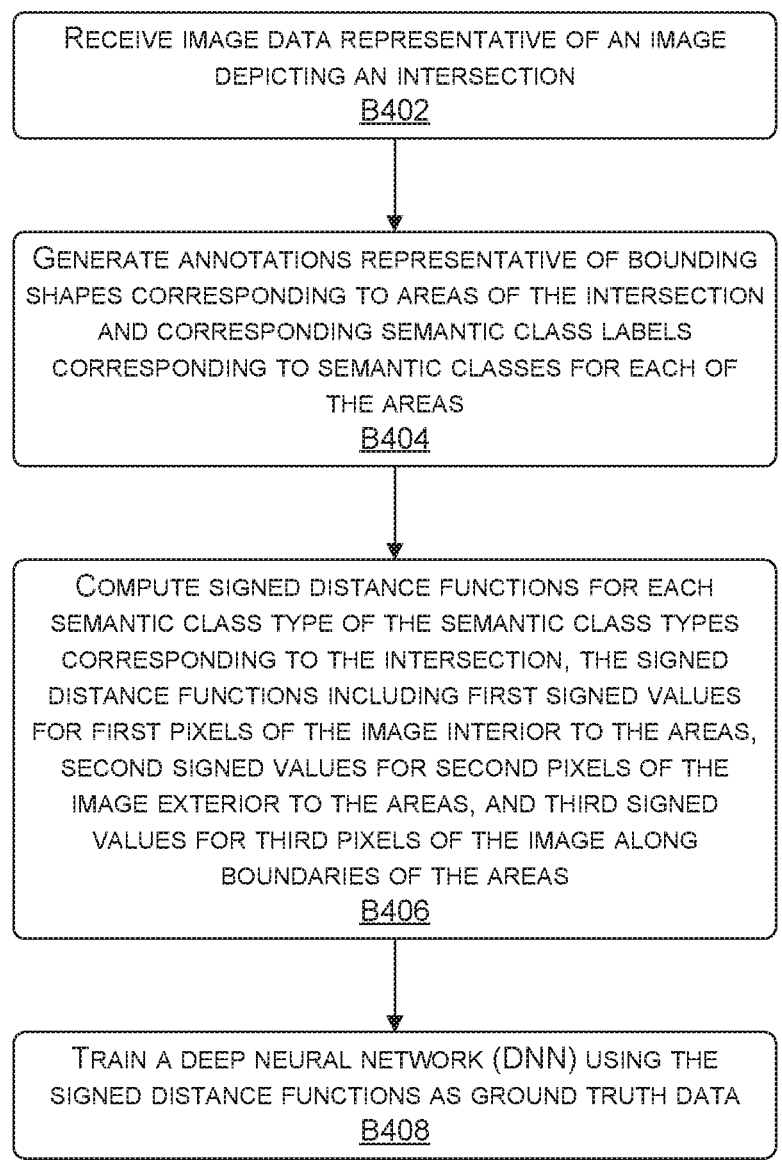
FIG. 4 is a flow diagram illustrating an example method for training a neural network to detect intersection areas, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the process 100 of FIG. 1. However, these methods may additionally or alternatively be executed by any one system, or any combination of systems, including, but not limited to, those described herein.

FIG. 4 is a flow diagram showing a method 400 for training a neural network to detect intersection areas, in accordance with some embodiments of the present disclosure. The method 400, at block B402, includes receiving image data representative of an image depicting an intersection. For example, the sensor data 102 may be received, where the sensor data 102 includes image data representing an image depicting an intersection.

The method 400, at block B404, includes generating annotations representative of bounding shapes corresponding to areas of the intersection and corresponding semantic class labels corresponding to semantic classes for each of the areas. For example, annotation(s) 110 may be generated and/or received, where the annotations represent bounding shapes corresponding to intersection area(s) 110A and corresponding classification(s) 110B for each of the intersection area(s) 110A.

The method 400, at block B406, includes computing signed distance functions for each semantic class type of the semantic class types corresponding to the intersection, the signed distance functions including first signed values for first pixels of the image interior to the areas, second signed values for second pixels of the image exterior to the areas, and third signed values for third pixels of the image along boundaries of the areas. For example, GT signed distance function(s) 116 may be computed for each intersection area type of the classification(s) 110B corresponding to the intersection. The GT signed distance function(s) 116 may include positive distance values for pixels interior to the intersection area(s) 110A, negative distance values for pixels exterior to the intersection area(s) 110A, and zero values for pixels along the boundaries of the intersection area(s) 110A.

The method 400, at block B408, includes training a deep neural network (DNN) using the signed distance functions as ground truth data. For example, the GT signed distance function(s) 116 may be used as ground truth data to train the machine learning model(s) 104.

Figure 5:
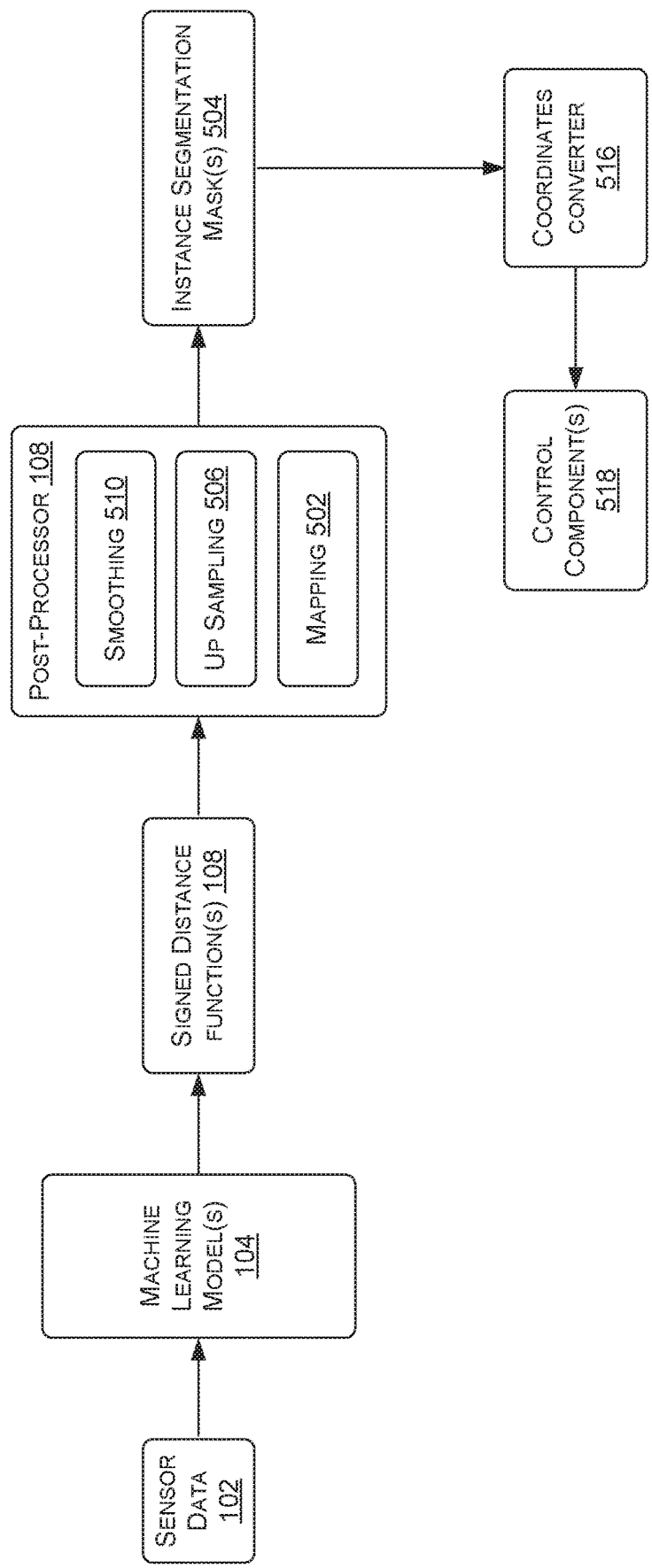
FIG. 5 is a data flow diagram illustrating an example process for detecting intersection areas using outputs from sensors of a vehicle in real-time or near real-time, in accordance with some embodiments of the present disclosure.

Referring now to FIG. 5, FIG. 5 is a data flow diagram illustrating an example process 500 for detecting intersection areas using outputs from sensors of a vehicle in real-time or near real-time, in accordance with some embodiments of the present disclosure. The sensor data 102 may be similar to that described herein at least with respect to FIG. 1. During deployment, the sensor data 102 may be applied to the machine learning model(s) 104 that has been trained according to the process 100, for example, to compute signed distance function(s) 108 (and corresponding classifications) using training sensor data 102. As such, the machine learning model(s) 104 may output—or regress on—one or more of the signed distance function(s) 108, as described in more detail at least with respect to the signed distance function(s) 108 in FIG. 1.

The signed distance function(s) 108 may be applied to a post-processor 502 to generate instance segmentation mask(s) 510. In some examples, the post-processor 502 may use one or more post-processing algorithms (e.g., temporal smoothing, upsampling, thresholding, clustering, mapping, etc.) to compute an instance segmentation mask(s) 510. For example, the post-processor 502 may use the signed distance function(s) 108 to generate a representation of the intersection areas, which may be used, in turn, to navigate the intersection—e.g., by control component(s) 516 of the vehicle. The instance segmentation mask(s) 510 may include intersection areas, classifications thereof, and/or other information corresponding to the intersection (e.g., polygons corresponding to the intersection areas which may be used to generate visualizations of the intersection for debugging, etc.).

The post-processor may perform smoothing 504, upsampling 506, and/or mapping 508 to generate the instance segmentation mask(s) 510. In some embodiments, the signed distance function(s) 108 may undergo smoothing 504 on a pixel-by-pixel basis to smooth out sharp peaks and fluctuations in the pixel values. In some examples, the smoothing 504 may include a Gaussian smoothing of each of signed distance function(s) 108 output by the machine learning model(s) 104. The sharp peaks and fluctuations in the signed distance function(s) 108 may be smoothed by applying a smoothing algorithm on each signed distance function(s) 108 to generate corresponding smoothed signed distance function(s).

In some embodiments, one or more of the signed distance function(s) 108 and/or smoothed signed distance function(s) may undergo upsampling 506. For example, the signed distance function(s) 108 may be generated at a first spatial resolution (e.g., a down-sampled spatial resolution) that is different from a second spatial resolution corresponding to the input spatial resolution of the sensor data 102. As such, the upsampling 506 may decode the data from the first spatial resolution of the signed distance function(s) 108 and convert or translate the data to the second spatial resolution of the sensor data 102. In some examples, bi-linear upsampling may be applied to each of the signed distance function(s) 108 and/or each of the smoothed signed distance function(s) to recover the original resolution of the sensor data 102 and to generate corresponding upsampled signed distance function(s). As a result, the processing speeds of the machine learning model(s) 104 may be increased—e.g., due to processing reduced spatial resolution data—while simultaneously preserving compute resources for other tasks of the system. In addition, by increasing processing speeds, the run-time of the system may be decreased thereby enabling real-time or near real-time deployment of the process 500 within the system (e.g., the vehicle 900).

The signed distance function(s) 108, the smoothed signed distance function(s), and/or the upsampled signed distance function(s) may then be mapped—e.g., using mapping 508, such as a mapping algorithm—to polygon areas representing the intersection areas based on the negative and positive values associated with each pixel in the corresponding signed distance function(s). The mapping 508 may include applying the signed distance function(s) 108 to a thresholding and/or clustering algorithm. In some embodiments, a watershed clustering algorithm may be used as the mapping 508 to generate an instance segmentation map(s) 510 corresponding to each detected intersection area for each signed distance function(s) 108. In such embodiments, for each intersection area, the pixels with distance values too high and too low may be filtered out using a predetermined threshold distance value—thereby reducing the compute resources required. The remaining pixels may be used to determine boundaries of the associated intersection areas, and/or to determine each pixel that is associated with a given region of the intersection having an associated classification type. Each pixel within boundaries of the polygon representing the intersection area may then be encoded with a pixel value depicting a segmentation (e.g., a class label or value) for the corresponding intersection area. The output of the post-processor 502 may be instance segmentation mask(s) 510 for each classification type—or instance thereof—corresponding to locations (e.g., two-dimensional coordinates) of different classification type regions of the intersection in image-space.

The instance segmentation mask(s) 510 may then be applied to the coordinates converter 512 to convert the 2D locations in image-space to 3D world-space coordinates for each of the detected intersection areas in the instance segmentation mask(s) 510. The 3D world-space coordinates may be used by the vehicle 900 for path planning, control decisions, and/or other processes for safely and efficiently navigating through the intersection in the world-space environment. Any known method of projecting 2D locations into 3D space may be used. In some examples, a flat model assumption may be used to project the locations into 3D space. In some other examples, LIDAR data for depth and/or distance estimation may be used for the projection, and/or future motion of the vehicle 900 as the vehicle 900 traverses the road surface may be used (e.g., to generate more accurate ground truth for training the network), such as to determine a slope or profile of the driving surface to more accurately project the 2D points into 3D space. In some embodiments, the machine learning model(s) 104 may be trained on 3D data to directly predict intersection area locations in 3D world-space.

As such, the 3D world-space coordinates determined from the instance segmentation map(s) 510 may be used to perform one or more operations by a control component(s) 514 of the vehicle 900. As non-limiting examples, a perception layer of an autonomous driving software stack may update information about the environment based on the intersection information, a world model manager may update the world model to reflect the location, distance, attributes, and/or other information about the intersection(s) and other vehicle(s), and/or a control layer may use the information for determining controls when approaching, navigating through, and/or exiting the intersection(s) (e.g., based on attributes such as wait conditions, contention areas, vehicles with priority, size of the intersection, distance to the intersection, etc.).

Now referring to FIG. 6, FIG. 6 illustrates example signed distance functions (e.g., signed distance function(s) 108 of FIG. 5) converted into corresponding instance segmentation masks (e.g., instance segmentation mask(s) 510 of FIG. 5) using a post-processor (e.g., post-processor 502), in accordance with some embodiments of the present disclosure. The signed distance functions 610A, 620A, 630A, and 640A include a visualization of predicted intersection areas of individual intersection area classes. Each of the signed distance functions 610A, 620A, 630A, and 640A may be smoothed and upsampled (e.g., using smoothing 504, upsampling 506, etc.) to generate smoothed and upsampled signed distance functions 610B, 620B, 630B, and 640B, respectively. For example, the pixels of the signed distance function 610A may undergo Gaussian smoothing to smooth sharp peaks and/or fluctuations in the signed distance function 610A to first generate a smoothed signed distance function. The smoothed signed distance function may then undergo upsampling 506 to recover original input image resolution of the sensor data (e.g., sensor data 102) to generate the corresponding smoothed and upsampled signed distance function 610B. Further, each smoothed and upsampled signed distance function 610B, 620B, 630B, and 640B may be mapped using mapping 508 to generate corresponding instance segmentation maps 610C, 620C, 630C, and 640C, respectively. For example, the smoothed and upsampled signed distance function 610B may undergo a watershed clustering algorithm to generate the instance segmentation mask 612C that can then be overlaid on the original image as can be seen in resulting instance segmentation map 610C. As such, the intersection areas detected in an image may be represented by a set of polygons for each intersection area classification.

Figure 7A:
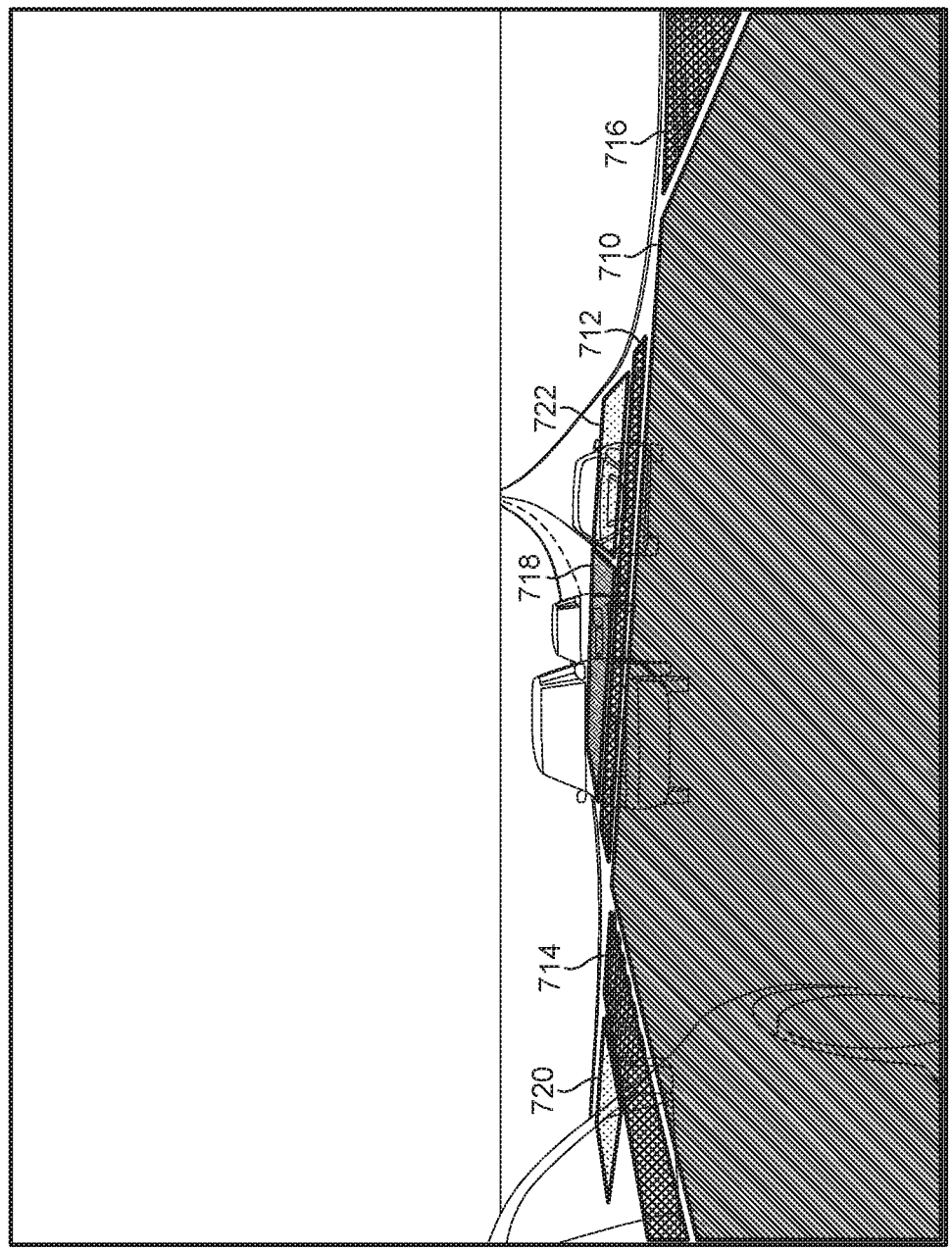
FIGS. 7A-7B are visualizations of example intersection areas predicted in a 3D space based on signed distance functions computed by a neural network, in accordance with some embodiments of the present disclosure.
Figure 7B:
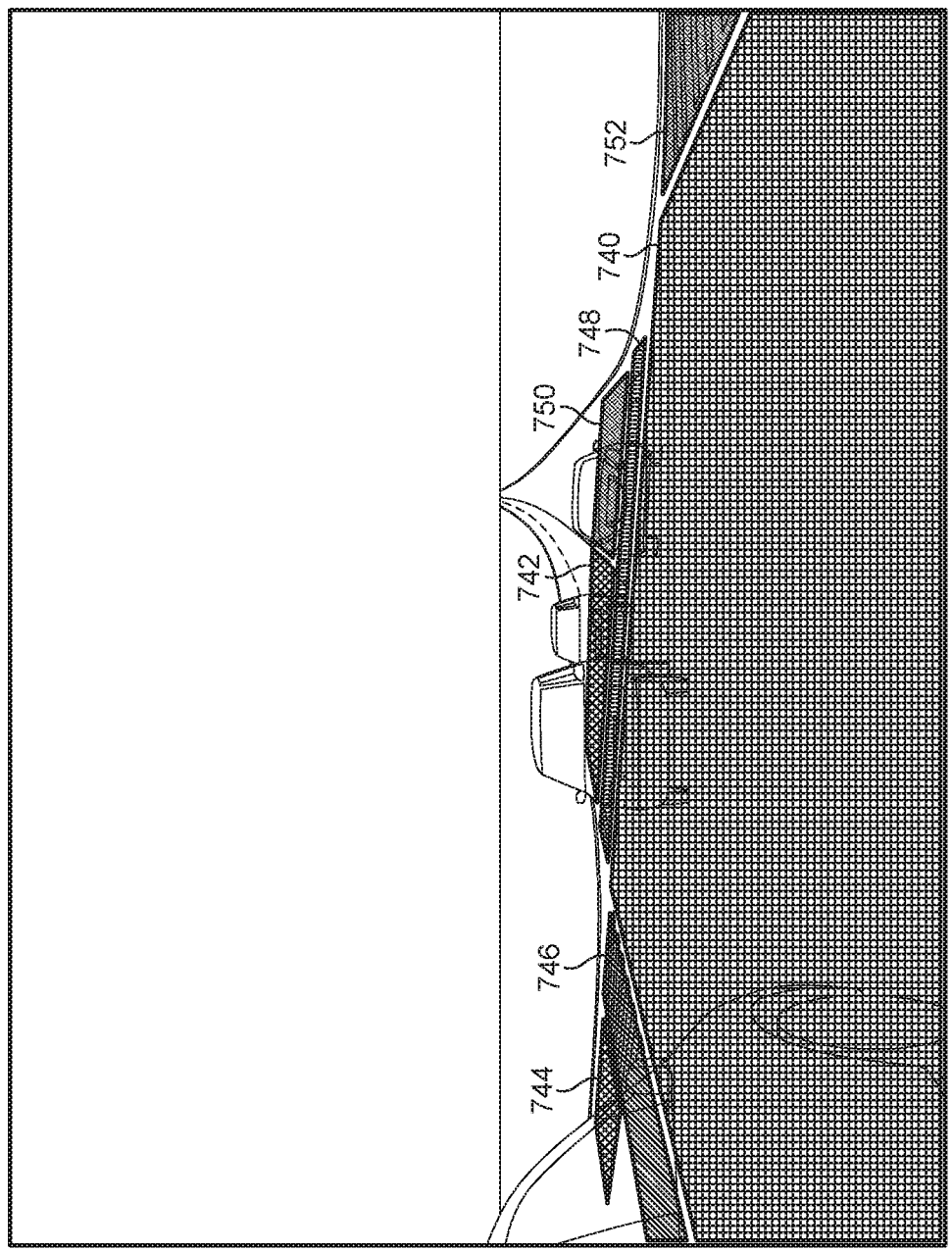

Referring to FIGS. 7A-7B, FIGS. 7A-7B illustrate example intersection areas predicted in a 3D space based on signed distance functions computed by a neural network, in accordance with some embodiments of the present disclosure. FIG. 7A illustrates a visualization of a prediction 700A of intersection areas 720, 712, 714, 716, 718, 720, and 722 that may be used to determine intersection traversal priorities in relation to other vehicles in the intersection. The different intersection area classifications may be represented by solid lines, dashed lines, different colors, etc. to represent different classifications. This is not intended to be limiting, and any visual convention for classifications may be used to illustrate differences in classifications for features (e.g., intersection areas) in the images. For example, it may be understood that intersection areas 712, 714, and 716 belong to a single intersection area classification. Similarly, intersection areas 720 and 722 may belong to another intersection area classification.

FIG. 7B illustrates another prediction 700B of intersection areas 740, 742, 744, 746, 748, 750, and 720 that may be used to determine intersection traversal priorities in relation to other vehicles by a control component (e.g., control component(s) 514 of the vehicle 900). The different intersection area classifications may be represented by solid lines, dashed lines, different colors, etc., to represent different classifications. This is not intended to be limiting, and any visual convention for classifications may be used to illustrate differences in classifications for features (e.g., intersection areas) in the images for visualization, debugging, or other purposes. For example, it may be understood that intersection areas 742, and 744 belong to a first intersection area classification. Similarly, intersection areas 750 and 752 may belong to a second intersection area classification, and so on. In this way, the intersection areas may be readily detectable as belonging to corresponding classifications.

Figure 8:
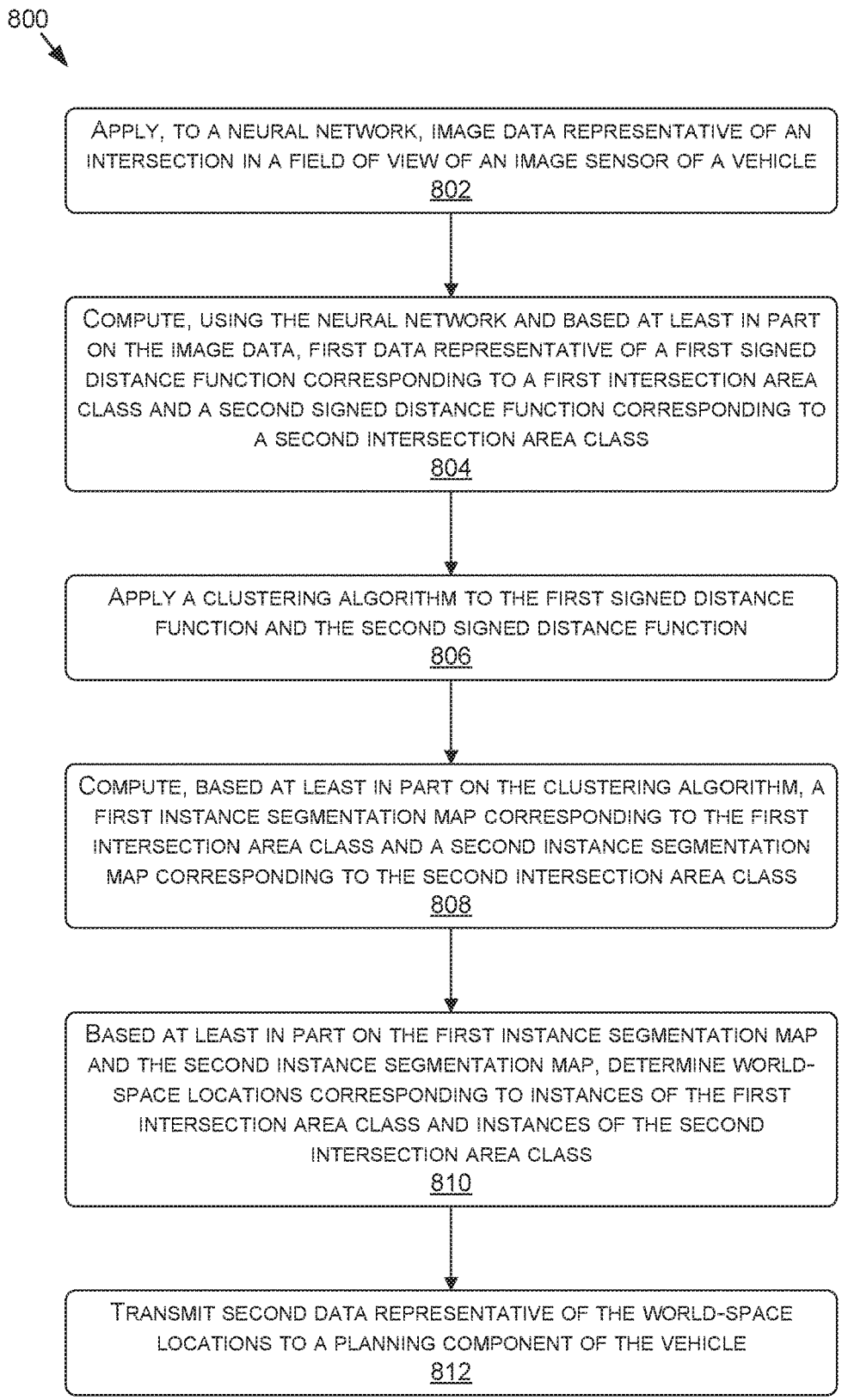
FIG. 8 is a flow diagram illustrating an example method for detecting intersection areas, in accordance with some embodiments of the present disclosure.

Now referring to FIG. 8, each block of method 800, described herein, comprises a computing process that may be performed using any combination of hardware, firmware, and/or software. For instance, various functions may be carried out by a processor executing instructions stored in memory. The method 800 may also be embodied as computer-usable instructions stored on computer storage media. The method 800 may be provided by a standalone application, a service or hosted service (standalone or in combination with another hosted service), or a plug-in to another product, to name a few. In addition, method 800 is described, by way of example, with respect to the process 500 of FIG. 5. However, these methods may additionally or alternatively be executed by any one system, or any combination of systems, including, but not limited to, those described herein.

FIG. 8 is a flow diagram showing a method 800 for detecting intersection areas, in accordance with some embodiments of the present disclosure. The method 800, at block B802, includes applying, to a neural network, image data representative of an intersection in a field of view of an image sensor of a vehicle. For example, sensor data 102 may be applied to the machine learning model(s) 104. The sensor data 102 may represent an intersection in a field of view of an image sensor of the vehicle 900.

The method 800, at block B804, includes computing, using the neural network and based at least in part on the image data, first data representative of a first signed distance function corresponding to a first intersection area class and a second signed distance function corresponding to a second intersection area class. For example, the machine learning model(s) 104 may output a signed distance function(s) 108 for each intersection area class of a plurality of intersection area classes based on the sensor data 102.

The method 800, at block B806, includes applying a clustering algorithm to the first signed distance function and the second signed distance function. For example, mapping 508, including clustering, may be performed on the signed distance function(s) 108.

The method 800, at block B808, includes computing, based at least in part on the clustering algorithm, a first instance segmentation map corresponding to the first intersection area class and a second instance segmentation map corresponding to the second intersection area class. For example, instance segmentation map(s) 510 may be computed corresponding to each intersection area class as detected in the signed distance function(s) 108 based on the mapping 508.

The method 800, at block B810, includes based at least in part on the first instance segmentation map and the second instance segmentation map, determining world-space locations corresponding to instances of the first intersection area class and instances of the second intersection area class. For example, 3D world-space locations corresponding to the instances of the intersection area classes may be determined by the coordinates converter 512 and based on the instance segmentation mask(s) 510.

The method 800, at block B810, includes transmitting second data representative of the world-space locations to a planning component of the vehicle. For example, the 3D world-space locations of the intersection areas may be transmitted to the control components 514 of the vehicle 900 for further processing.

Example Autonomous Vehicle

Figure 9A:
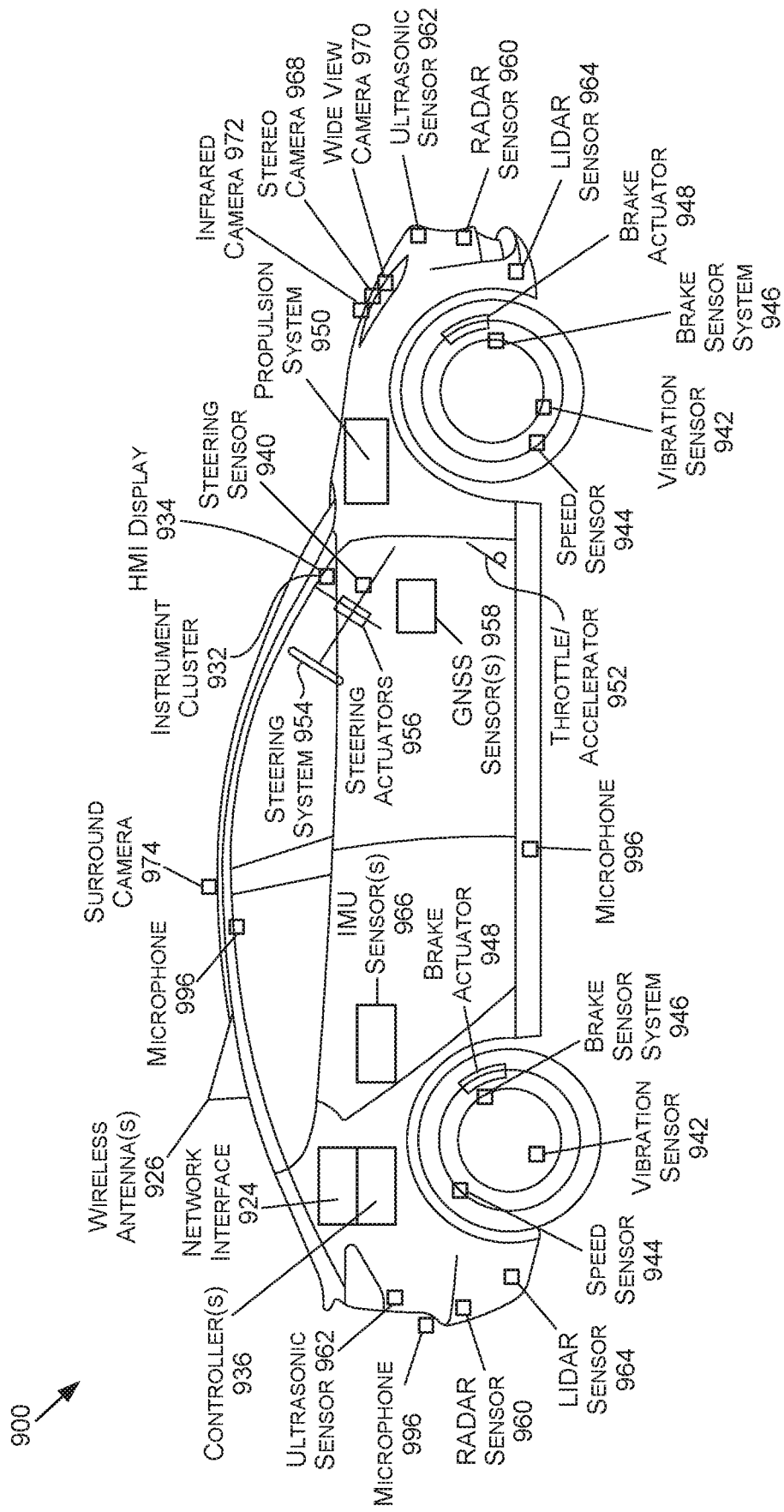
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. For example, the vehicle 900 may be capable of conditional automation (Level 3), high automation (Level 4), and/or full automation (Level 5), depending on the embodiment.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the HD map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over LTE, WCDMA, UMTS, GSM, CDMA2000, etc. The wireless antenna(s) 926 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 9B:
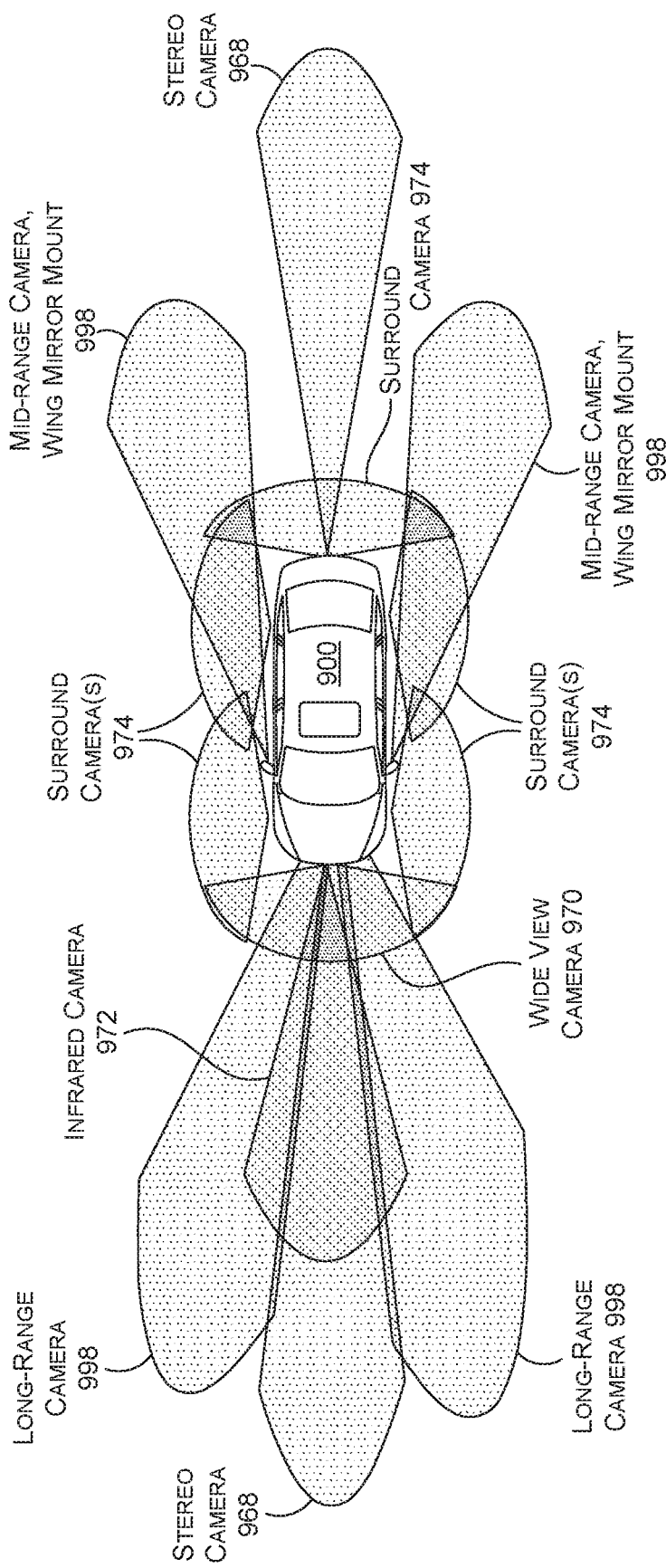
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 920 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may any number of wide-view cameras 970 on the vehicle 900. In addition, long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

One or more stereo cameras 968 may also be included in a front-facing configuration. The stereo camera(s) 968 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
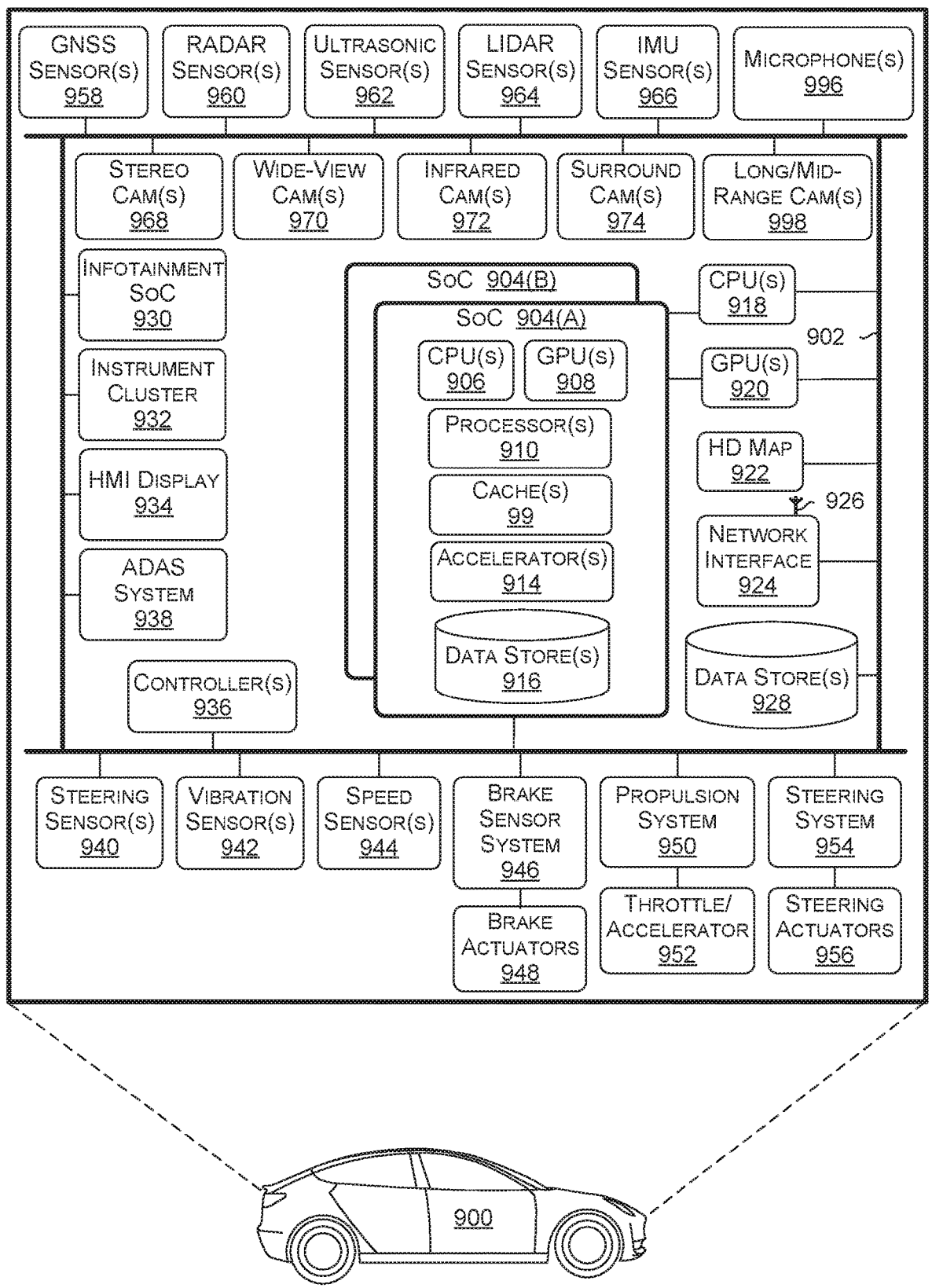
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 920-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
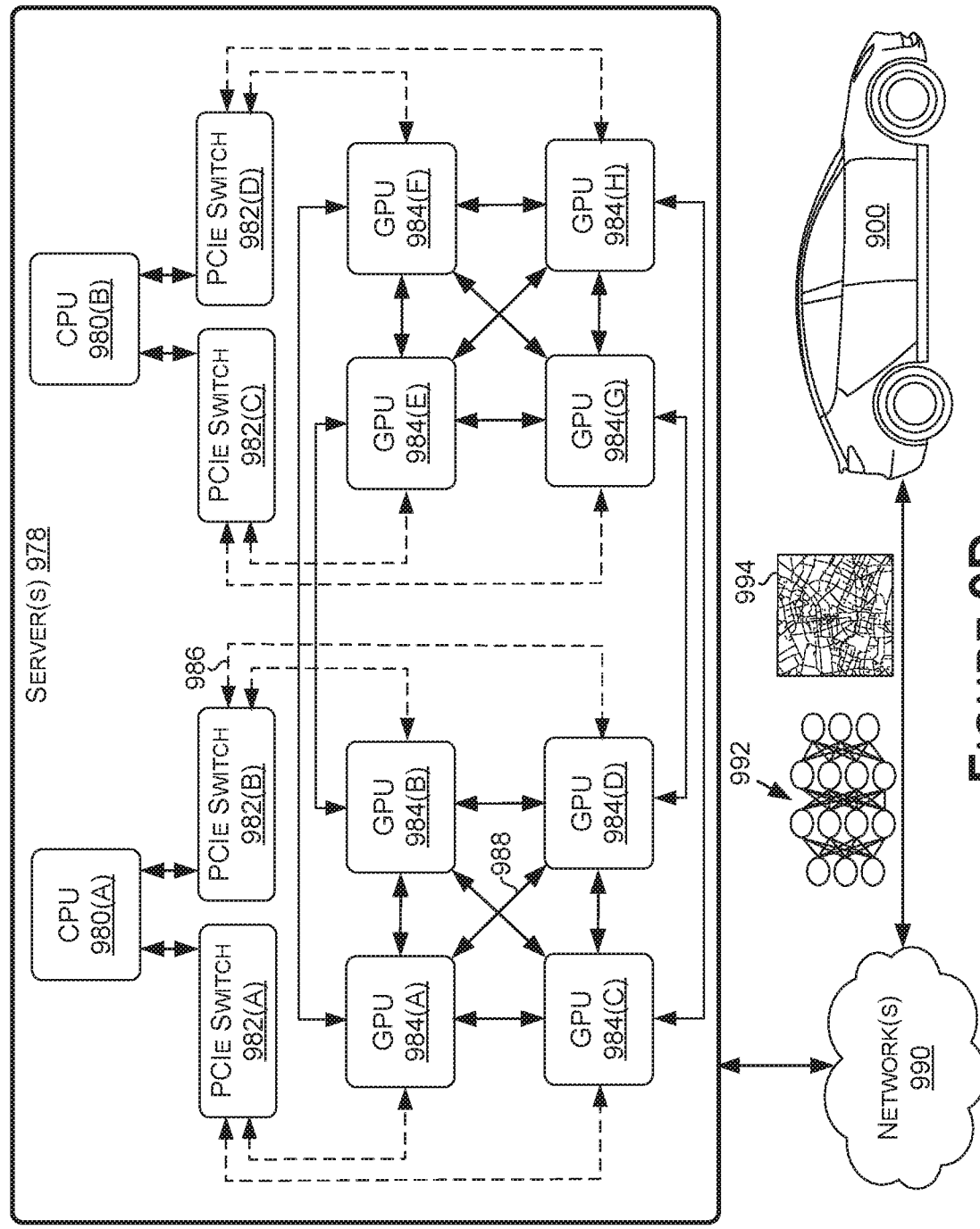
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
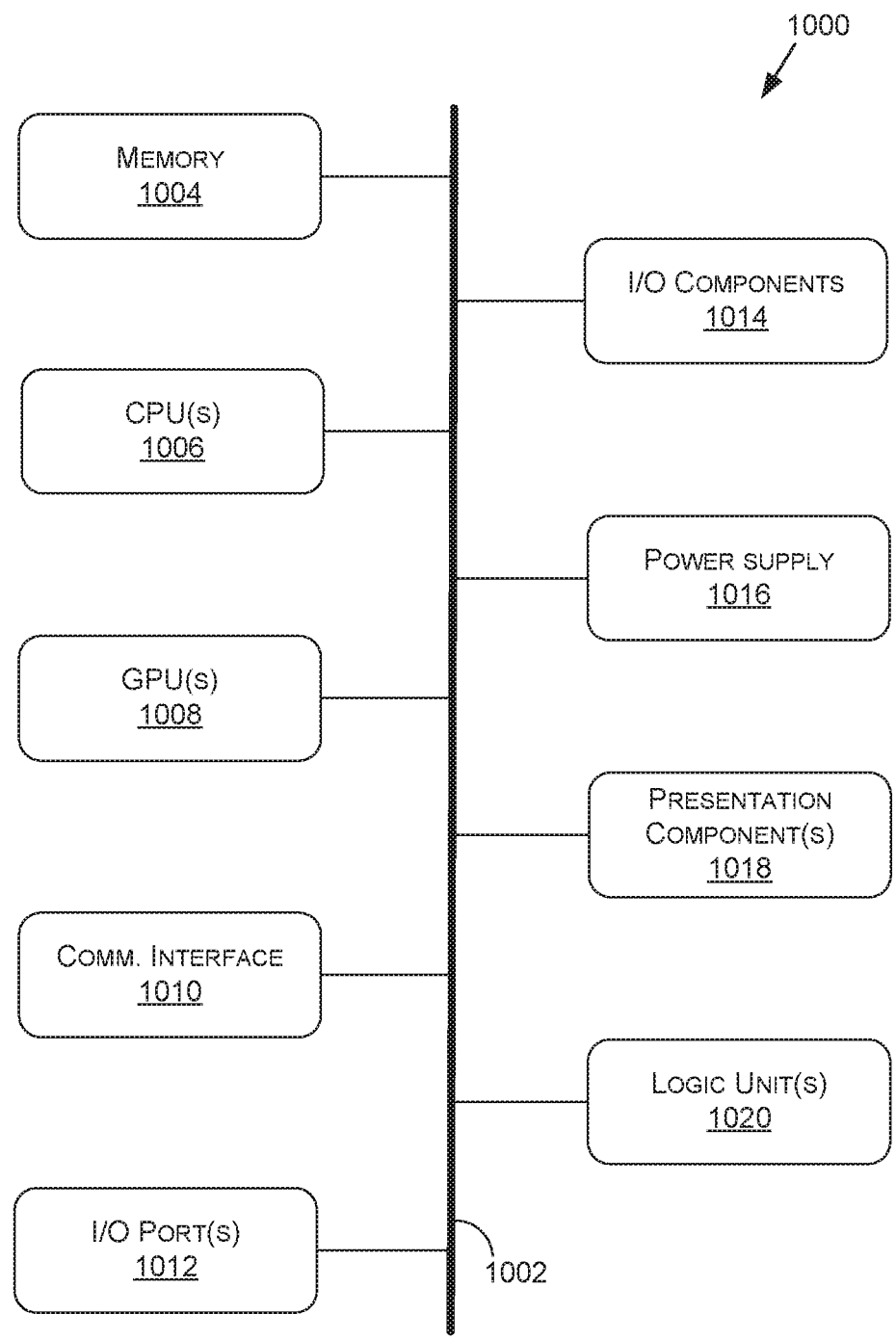
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof.

The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, etc.), and output the data (e.g., as an image, video, sound, etc.).

Examples Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
applying, to a neural network, image data representative of an intersection;
computing, using the neural network and based at least in part on the image data, first data representative of at least one first signed distance corresponding to a first intersection area class and at least one second signed distance corresponding to a second intersection area class;
applying a clustering algorithm to the at least one first signed distance and the at least one second signed distance;
computing, based at least in part on the clustering algorithm, a first instance segmentation map corresponding to the first intersection area class and a second instance segmentation map corresponding to the second intersection area class;
based at least in part on the first instance segmentation map and the second instance segmentation map, determining world-space locations corresponding to instances of the first intersection area class and instances of the second intersection area class; and
transmitting second data representative of the world-space locations to a planning component of a vehicle.

2. The method of claim 1, further comprising:
applying a smoothing operation to the at least one first signed distance and the at least one second signed distance to generate at least one smoothed first signed distance and at least one smoothed second signed distance; and
wherein the applying the clustering algorithm comprises applying the clustering algorithm to the smoothed first signed distance and the smoothed second signed distance.

3. The method claim 2, wherein the smoothing operation is applied to values for each pixel of an image representative of the image data, and corresponding to the at least one first signed distance and the at least one second signed distance.

4. The method of claim 2, wherein the smoothing operation is a Gaussian smoothing operation.

5. The method of claim 1, wherein the image data is applied to the neural network at a first spatial resolution, the at least one first signed distance and the at least one second signed distance are output at a second spatial resolution less than the first spatial resolution, and the method further comprises:
applying an up-sampling operation to the at least one first signed distance and the at least one second signed distance to generate at least one up-sampled first signed distance and at least one up-sampled second signed distance at the first spatial resolution.

6. The method of claim 1, wherein the clustering algorithm is a watershed clustering algorithm.

7. The method of claim 1, further comprising:
applying a threshold of value zero to each sign of the at least one first signed distance and the at least one second signed distance,
wherein the clustering algorithm is applied after the applying the threshold of value zero.

8. The method of claim 1, wherein the first instance segmentation map and the second instance segmentation map are represented in image-space, and the determining the world-space locations including converting image-space locations to the world-space locations using one or more of intrinsic sensor parameters or extrinsic sensor parameters.

9. A system comprising:
one or more image sensors of a vehicle;
one or more processors;
one or more memory devices storing instructions thereon that, when executed using the one or more processors, cause the one or more processors to execute operations comprising:
applying, to a deep neural network (DNN), image data representative of an intersection;
computing, using the DNN and based at least in part on the image data, first data representative of one or more signed distances, each signed distance of the one or more signed distances corresponding to an intersection area class the DNN is trained to predict;
applying a clustering algorithm to the one or more signed distances;
computing, based at least in part on the clustering algorithm, instance segmentation maps in image-space, each instance segmentation map corresponding to the intersection area class of a corresponding signed distance;
determining world-space locations corresponding to the instance segmentation maps; and
transmitting second data representative of the world-space locations to a planning component of a vehicle.

10. The system of claim 9, wherein the operations further comprise:
applying a smoothing operation to each signed distance of the one or more signed distances to generate one or more corresponding smoothed first signed distances; and
wherein the applying the clustering algorithm is to the one or more smoothed first signed distances.

11. The system of claim 10, wherein the smoothing operation is applied to values for each pixel of an image representative of the image data, and corresponding to each signed distance of the one or more signed distances.

12. The system of claim 9, wherein the operations further comprise:
applying a threshold of value zero to each sign of the one or more signed distances;
wherein the applying the clustering algorithm is after the applying the threshold of value zero.

13. The system of claim 9, wherein the image data is applied to the DNN at a first spatial resolution, the one or more signed distances are output at a second spatial resolution less than the first spatial resolution, and the operations further comprise:
applying an up-sampling operation each signed distance of the one or more signed distances to generate one or more corresponding up-sampled signed distances at the first spatial resolution.

14. A processor comprising:
processing circuitry to:
generate, using a neural network and based at least in part on image data generated using one or more sensors of an ego-machine, one or more signed distances each signed distance of the one or more signed distances corresponding to one or more intersection classes;
compute, based at least in part on applying a clustering algorithm to the one or more signed distances, one or more instance segmentation masks each corresponding to a respective signed distance of the one or more signed distances;

based at least in part on the one or more instance segmentation maps, determine locations corresponding to instances of the one or more intersection classes; and perform one or more operations for controlling the ego-machine based at least in part on the locations.

15. The processor of claim 14, wherein the processing circuitry is further to:

apply a smoothing operation to the one or more signed distances to generate one or more smoothed signed distances, wherein the clustering algorithm is applied to the one or more smoothed signed distances.

16. The processor of claim 15, wherein the smoothing operation is applied to one or more values for one or more pixels of an image represented by the image data, and corresponding to the one or more signed distances.

17. The processor of claim 15, wherein the smoothing operation is a Gaussian smoothing operation.

18. The processor of claim 14, wherein the image data is applied to the neural network at a first spatial resolution, the one or more signed distances are output at a second spatial resolution less than the first spatial resolution, and the processing circuitry is further to:

apply an up-sampling operation to the one or more signed distances to generate one or more up-sampled first signed distances at the first spatial resolution.

19. The processor of claim 14, wherein the clustering algorithm is a watershed clustering algorithm.

20. The processor of claim 14, wherein the processing circuitry is further to:

apply a threshold of value zero to one or more signs of the one or more signed distances;

wherein the clustering algorithm is applied after the application of the threshold of value zero.

* * * * *